US012633967B2

(12) United States Patent
Yapici et al.

(10) Patent No.: US 12,633,967 B2
(45) Date of Patent: May 19, 2026

(54) TECHNIQUES FOR DISTANCE SCANNING IN A NEAR FIELD REGION OF A RECONFIGURABLE INTELLIGENT SURFACE

(71) Applicant: QUALCOMM Incorporated, San Diego, CA (US)

(72) Inventors: Yavuz Yapici, Florham Park, NJ (US); Narayan Prasad, Westfield, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 18/189,951

(22) Filed: Mar. 24, 2023

(65) Prior Publication Data

US 2024/0322864 A1 Sep. 26, 2024

(51) Int. Cl.
| | |
|---|---|
| *H04B 7/04* | (2017.01) |
| *G01S 13/75* | (2006.01) |
| *H04B 7/06* | (2006.01) |

(52) U.S. Cl.
CPC .......... *H04B 7/04013* (2023.05); *G01S 13/75* (2013.01); *H04B 7/06966* (2023.05)

(58) Field of Classification Search
CPC ................ H04B 7/0617; H04B 7/0695; H04B 7/04013; H04B 7/088; H04B 7/06952; H04B 7/086; H04B 7/026; H04B 7/0632; H04B 7/0639; H04B 7/06954; H04B 7/145; H04B 7/0626; H04B 7/063; H04B 7/0408; H04B 7/0417; H04B 7/0452; H04B 7/0696; H04B 7/15528; H04B 17/318; H04B 17/327; H04W 16/28; H04W 24/10;

(Continued)

(56) References Cited

U.S. PATENT DOCUMENTS

| | | | | |
|---|---|---|---|---|
| 2024/0125890 A1* | 4/2024 | Jung | ................... | H04B 7/04013 |
| 2024/0171239 A1* | 5/2024 | Wang | ................... | H04B 7/0617 |

(Continued)

FOREIGN PATENT DOCUMENTS

| | | | | |
|---|---|---|---|---|
| WO | WO-2023272682 A1 * | 1/2023 | ......... | H04B 7/04013 |

OTHER PUBLICATIONS

Wang Tao et al: "Near-Field Beam Management in LIS-Assisted mmWave Systems", 2021 13th International Conference on Wireless Communications and Signal Processing (WCSP), IEEE, Oct. 20, 2021 (Oct. 20, 2021), pp. 1-6 (Year: 2021).*

International Search Report and Written Opinion—PCT/US2024/018045—ISA/EPO—Jul. 3, 2024.

(Continued)

*Primary Examiner* — Golam Sorowar

(74) *Attorney, Agent, or Firm* — Holland & Hart LLP/Qualcomm Incorporated

(57) ABSTRACT

Methods, systems, and devices for wireless communications are described. Techniques described herein provide for a network entity to determine a beam focusing distance for a reconfigurable intelligent surface (RIS) for a user equipment (UE) located in the near field region of the RIS. The beam focusing distance may be determined using reference signals for different test beam focusing distances within the near field region of the RIS. The test beams may have a same angular direction from the RIS to the UE. The test beams may have a beam focusing distance selected from a set of beam focusing distances within the near field region of the RIS.

23 Claims, 21 Drawing Sheets

(58) Field of Classification Search
 CPC .............. H04W 64/00; H04W 64/003; H04W
  4/029; H04W 4/027; H04W 64/006;
  H04W 72/51; H04W 92/18; H04W 16/26;
  H04W 24/08; H04W 4/025; H04W 72/20;
  H04W 4/40; H04W 52/42
 See application file for complete search history.

(56) References Cited

U.S. PATENT DOCUMENTS

| | | | |
|---|---|---|---|
| 2024/0405807 A1* | 12/2024 | Haija | H04B 7/04013 |
| 2024/0413868 A1* | 12/2024 | Haghighat | H04L 25/0204 |
| 2025/0096852 A1* | 3/2025 | Tong | H04B 7/06952 |
| 2025/0183943 A1* | 6/2025 | Wong | H04B 7/04013 |

OTHER PUBLICATIONS

Wang T., et al., "Near-Field Beam Management in LIS-Assisted mmWave Systems", 2021 13th International Conference on Wireless Communications and Signal Processing (WCSP), IEEE, Oct. 20, 2021, pp. 1-6, XP034032753.
Zhang Y., et al., "Fast Near-Field Beam Training for Extremely Large-Scale Array", IEEE Wireless Communications Letters, vol. 11, No. 12, Oct. 5, 2022, pp. 2625-2337, XP011929925.

\* cited by examiner

Receiver

Communications Manager

Transmitter

1010

1020

1015

1005

1000

130

105

115

Network Entity

Transceiver

1310

Antenna

1315

Communications Manager

1320

Memory

Code

1330

1325

1340

Processor

1335

1305

1300

1410

1420

1415

1405

1400

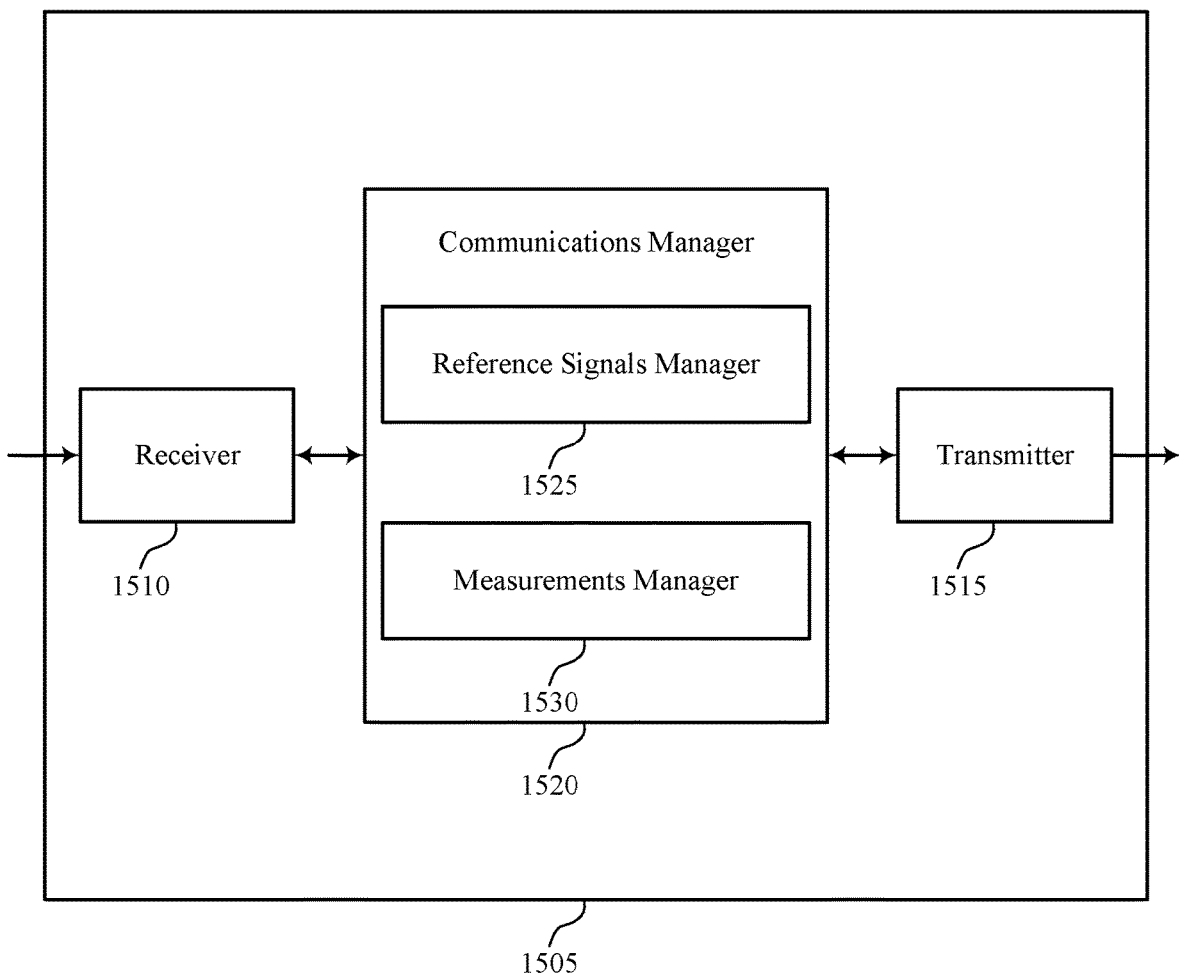
Receiver
1510
Communications Manager
Reference Signals Manager
1525
Measurements Manager
1530
1520
Transmitter
1515
1500
FIG. 15

Receiving a set of reference signals
1805

Steering, to a UE, the set of reference signals via a set of beams, each beam of the set of beams have a respective beam focusing distance selected from a set of beam focusing distances within a near field region of the RIS
1810

Receiving, from the UE, measurements for the set of reference signals
1815

1800

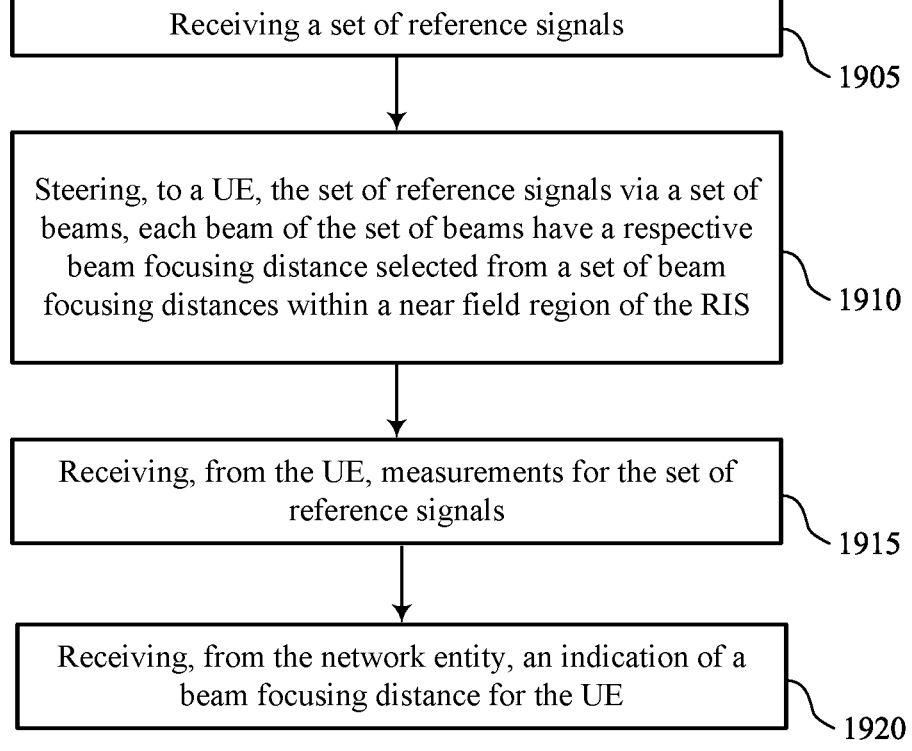

Receiving a set of reference signals

1905

Steering, to a UE, the set of reference signals via a set of beams, each beam of the set of beams have a respective beam focusing distance selected from a set of beam focusing distances within a near field region of the RIS

1910

Receiving, from the UE, measurements for the set of reference signals

1915

Receiving, from the network entity, an indication of a beam focusing distance for the UE

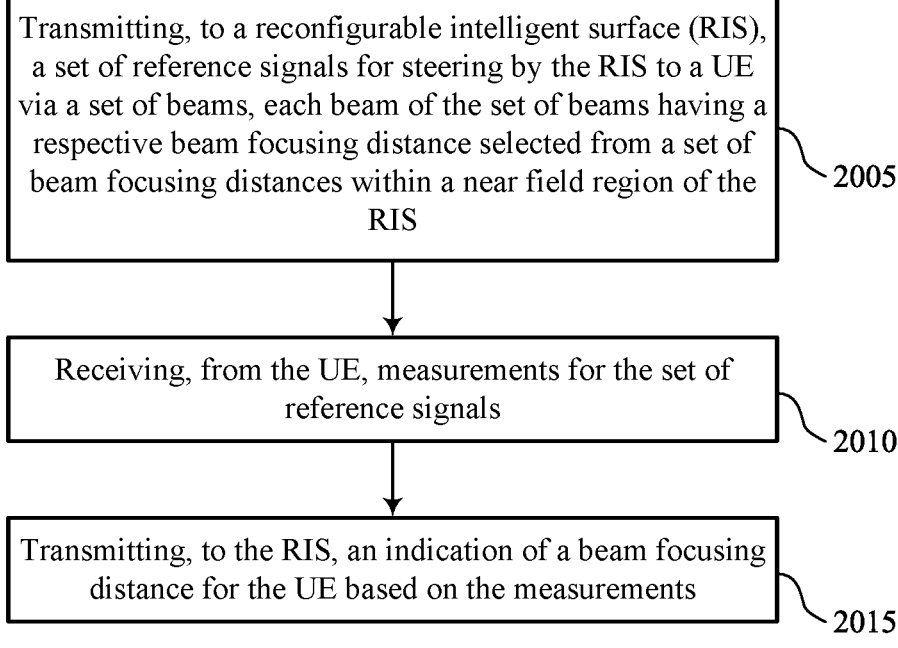

Transmitting, to a reconfigurable intelligent surface (RIS), a set of reference signals for steering by the RIS to a UE via a set of beams, each beam of the set of beams having a respective beam focusing distance selected from a set of beam focusing distances within a near field region of the RIS

2005

Receiving, from the UE, measurements for the set of reference signals

2010

Transmitting, to the RIS, an indication of a beam focusing distance for the UE based on the measurements

Receiving, from a reconfigurable intelligent surface (RIS), a set of reference signals via a set of beams, each beam of the set of beams having a respective beam focusing distance selected from a set of beam focusing distances within a near field region of the RIS

2105

Transmitting, to a network entity, measurements for the set of reference signals

2110

2100

TECHNIQUES FOR DISTANCE SCANNING IN A NEAR FIELD REGION OF A RECONFIGURABLE INTELLIGENT SURFACE

FIELD OF DISCLOSURE

The present disclosure, for example, relates to wireless communications, more particularly to techniques for distance scanning in a near field region of a reconfigurable intelligent surface.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support distance scanning in a near field region of a reconfigurable intelligent surface (RIS). A RIS may also be referred to as a metasurface, an intelligent reflection surface (IRS) or a reflectarray. For example, the described techniques provide for a network entity to determine a beam focusing distance for a user equipment (UE) located in the near field region of the RIS. The beam focusing distance may be determined using reference signals for different test beam focusing distances within the near field region of the RIS. The network entity may transmit, to the RIS, a set of reference signals. The RIS may steer the reference signals to the UE via a set of beams having a same angular direction to the UE. The beams may have a beam focusing distance selected from a set of beam focusing distances within the near field region of the RIS. The UE may receive, from the RIS, the set of reference signals and may transmit, to the network entity (e.g., via the RIS), reference signal received power (RSRP) measurements corresponding to the set of reference signals. The network entity may determine the beam focusing distance for the UE as the beam focusing distance associated with the highest RSRP.

A method for wireless communication at a RIS is described. The method may include receiving a set of reference signals, steering, to a user equipment (UE), the set of reference signals via a set of beams, each beam of the set of beams having a respective beam focusing distance selected from a set of beam focusing distances within a near field region of the RIS, and receiving, from the UE, measurements for the set of reference signals.

An apparatus for wireless communication at a RIS is described. The apparatus may include a processor, memory coupled with the processor, and instructions stored in the memory. The instructions may be executable by the processor to cause the apparatus to receive a set of reference signals, steering, to a UE, the set of reference signals via a set of beams, each beam of the set of beams have a respective beam focusing distance selected from a set of beam focusing distances within a near field region of the RIS, and receive, from the UE, measurements for the set of reference signals.

Another apparatus for wireless communication at a RIS is described. The apparatus may include means for receiving a set of reference signals, means for steering, to a UE, the set of reference signals via a set of beams, each beam of the set of beams having a respective beam focusing distance selected from a set of beam focusing distances within a near field region of the RIS, and means for receiving, from the UE, measurements for the set of reference signals.

A non-transitory computer-readable medium storing code for wireless communication at a RIS is described. The code may include instructions executable by a processor to receive a set of reference signals, steering, to a UE, the set of reference signals via a set of beams, each beam of the set of beams have a respective beam focusing distance selected from a set of beam focusing distances within a near field region of the RIS, and receive, from the UE, measurements for the set of reference signals.

Some examples of the method, apparatuses, and non-transitory computer-readable medium described herein may further include operations, features, means, or instructions for transmitting, to a network entity, the measurements for the set of reference signals.

Some examples of the method, apparatuses, and non-transitory computer-readable medium described herein may further include operations, features, means, or instructions for receiving, from a network entity, an indication of a beam focusing distance for the UE based on the measurements.

In some examples of the method, apparatuses, and non-transitory computer-readable medium described herein, the set of beam focusing distances include varying distance deltas.

Some examples of the method, apparatuses, and non-transitory computer-readable medium described herein may further include operations, features, means, or instructions for receiving, from a network entity, first control signaling indicating an angular direction for the set of beams.

In some examples of the method, apparatuses, and non-transitory computer-readable medium described herein, steering the set of reference signals via the set of beams may include operations, features, means, or instructions for steering the set of beams in the angular direction.

In some examples of the method, apparatuses, and non-transitory computer-readable medium described herein, steering the set of reference signals via the set of beams may include operations, features, means, or instructions for obtaining the set of beam focusing distances from a codebook.

Some examples of the method, apparatuses, and non-transitory computer-readable medium described herein may further include operations, features, means, or instructions for receiving, from a network entity, third control signaling indicating a phase matrix, where the phase matrix indicating an angular direction for the set of beams.

Some examples of the method, apparatuses, and non-transitory computer-readable medium described herein may further include operations, features, means, or instructions for transmitting, to a network entity, control signaling indicating attributes of the RIS.

In some examples of the method, apparatuses, and non-transitory computer-readable medium described herein, the set of beams may include operations, features, means, or instructions for a first beam having a first beam focusing distance and a second beam having a second beam focusing distance.

Some examples of the method, apparatuses, and non-transitory computer-readable medium described herein may further include operations, features, means, or instructions for receiving, from a network entity, second control signaling indicating the set of beam focusing distances.

In some examples of the method, apparatuses, and non-transitory computer-readable medium described herein, the second control signaling indicating the set of beam focusing distances from a codebook.

A method for wireless communication at a network entity is described. The method may include transmitting, to a RIS, a set of reference signals for steering by the RIS to a UE via a set of beams, each beam of the set of beams having a respective beam focusing distance selected from a set of beam focusing distances within a near field region of the RIS, receiving, from the UE, measurements for the set of reference signals, and transmitting, to the RIS, an indication of a beam focusing distance for the UE based on the measurements.

An apparatus for wireless communication at a network entity is described. The apparatus may include a processor, memory coupled with the processor, and instructions stored in the memory. The instructions may be executable by the processor to cause the apparatus to transmit, to a RIS, a set of reference signals for steering by the RIS to a UE via a set of beams, each beam of the set of beams having a respective beam focusing distance selected from a set of beam focusing distances within a near field region of the RIS, receive, from the UE, measurements for the set of reference signals, and transmit, to the RIS, an indication of a beam focusing distance for the UE based on the measurements.

Another apparatus for wireless communication at a network entity is described. The apparatus may include means for transmitting, to a RIS, a set of reference signals for steering by the RIS to a UE via a set of beams, each beam of the set of beams having a respective beam focusing distance selected from a set of beam focusing distances within a near field region of the RIS, means for receiving, from the UE, measurements for the set of reference signals, and means for transmitting, to the RIS, an indication of a beam focusing distance for the UE based on the measurements.

A non-transitory computer-readable medium storing code for wireless communication at a network entity is described. The code may include instructions executable by a processor to transmit, to a RIS, a set of reference signals for steering by the RIS to a UE via a set of beams, each beam of the set of beams having a respective beam focusing distance selected from a set of beam focusing distances within a near field region of the RIS, receive, from the UE, measurements for the set of reference signals, and transmit, to the RIS, an indication of a beam focusing distance for the UE based on the measurements.

Some examples of the method, apparatuses, and non-transitory computer-readable medium described herein may further include operations, features, means, or instructions for receiving, from the RIS, control signaling indicating attributes of the RIS, where the beam focusing distance for the UE based on the attributes of the RIS.

In some examples of the method, apparatuses, and non-transitory computer-readable medium described herein, the set of beam focusing distances include varying distance deltas.

Some examples of the method, apparatuses, and non-transitory computer-readable medium described herein may further include operations, features, means, or instructions for transmitting, to the RIS, first control signaling indicating an angular direction for the set of beams.

Some examples of the method, apparatuses, and non-transitory computer-readable medium described herein may further include operations, features, means, or instructions for transmitting, to the RIS, second control signaling indicating the set of beam focusing distances.

Some examples of the method, apparatuses, and non-transitory computer-readable medium described herein may further include operations, features, means, or instructions for receiving, from the RIS, control signaling indicating attributes of the RIS, where the set of beam focusing distances may be based on the attributes of the RIS.

Some examples of the method, apparatuses, and non-transitory computer-readable medium described herein may further include operations, features, means, or instructions for transmitting, to the RIS, control signaling indicating a phase matrix, where the phase matrix indicates an angular direction for the set of beams.

In some examples of the method, apparatuses, and non-transitory computer-readable medium described herein, receiving measurements for the set of reference signals may include operations, features, means, or instructions for receiving a set of RSRP values corresponding to the set of reference signals.

In some examples of the method, apparatuses, and non-transitory computer-readable medium described herein, the set of beams may include operations, features, means, or instructions for a first beam having a first beam focusing distance and a second beam having a second beam focusing distance.

In some examples of the method, apparatuses, and non-transitory computer-readable medium described herein, receiving measurements for the set of reference signals may include operations, features, means, or instructions for receiving a first RSRP value associated with the first beam and a second RSRP value associated with the second beam, computing a difference between the first RSRP value and the second RSRP value, and identifying the beam focusing distance for the UE based on comparing the difference to a delta RSRP raster.

A method for wireless communication at a UE is described. The method may include receiving, from a RIS, a set of reference signals via a set of beams, each beam of the set of beams having a respective beam focusing distance selected from a set of beam focusing distances within a near field region of the RIS and transmitting, to a network entity, measurements for the set of reference signals.

An apparatus for wireless communication at a UE is described. The apparatus may include a processor, memory coupled with the processor, and instructions stored in the memory. The instructions may be executable by the processor to cause the apparatus to receive, from a RIS, a set of reference signals via a set of beams, each beam of the set of beams having a respective beam focusing distance selected from a set of beam focusing distances within a near field region of the RIS and transmit, to a network entity, measurements for the set of reference signals.

Another apparatus for wireless communication at a UE is described. The apparatus may include means for receiving, from a RIS, a set of reference signals via a set of beams, each beam of the set of beams having a respective beam focusing distance selected from a set of beam focusing distances within a near field region of the RIS and means for transmitting, to a network entity, measurements for the set of reference signals.

A non-transitory computer-readable medium storing code for wireless communication at a UE is described. The code may include instructions executable by a processor to receive, from a RIS, a set of reference signals via a set of beams, each beam of the set of beams having a respective beam focusing distance selected from a set of beam focusing distances within a near field region of the RIS and transmit, to a network entity, measurements for the set of reference signals.

In some examples of the method, apparatuses, and non-transitory computer-readable medium described herein, transmitting the measurements for the set of reference signals may include operations, features, means, or instructions for transmitting a set of RSRP values corresponding to the set of reference signals.

In some examples of the method, apparatuses, and non-transitory computer-readable medium described herein, the set of beam focusing distances include varying distance deltas.

In some examples of the method, apparatuses, and non-transitory computer-readable medium described herein, receiving the set of reference signals via the set of beams may include operations, features, means, or instructions for receiving a first reference signal via a first beam having a first beam focusing distance and receiving a second reference signal via a second beam having a second beam focusing distance.

In some examples of the method, apparatuses, and non-transitory computer-readable medium described herein, transmitting the measurements for the set of reference signals may include operations, features, means, or instructions for transmitting a first RSRP value associated with the first reference signal and a second RSRP value associated with the second reference signal.

BRIEF DESCRIPTION OF THE DRAWINGS

FIGS. 14 and 15 show block diagrams of devices that support techniques for distance scanning in a near field region of a RIS in accordance with various aspects of the present disclosure.

FIGS. 18 through 21 show flowcharts illustrating methods that support techniques for distance scanning in a near field region of a RIS in accordance with various aspects of the present disclosure.

DETAILED DESCRIPTION

Figure 1:
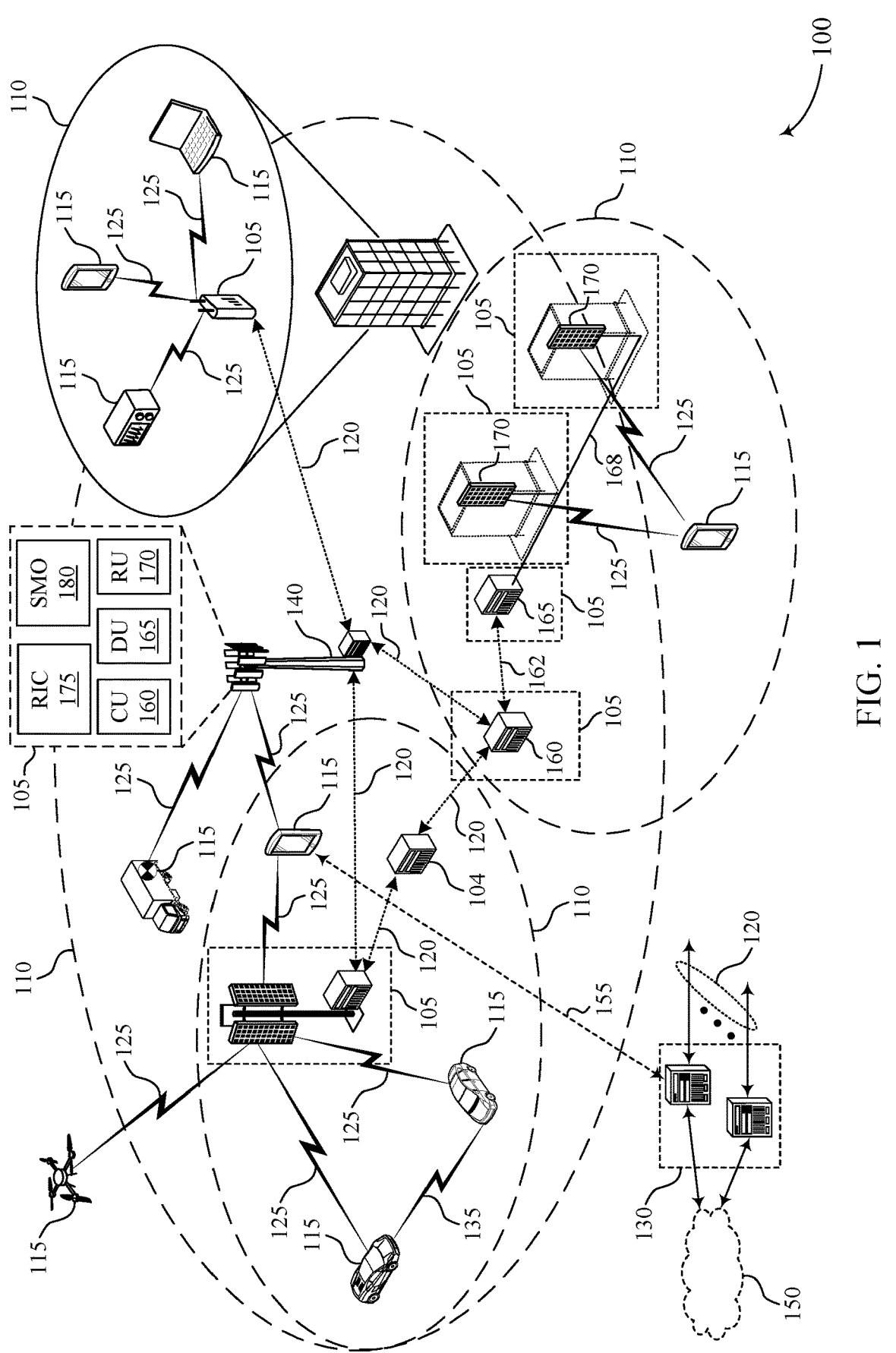
FIG. 1 shows an example of a wireless communications system that supports techniques for distance scanning in a near field region of a reconfigurable intelligent surface (RIS) in accordance with various aspects of the present disclosure.

Some wireless communications systems may implement a reconfigurable intelligent surface (RIS) to steer signaling towards a user equipment (UE). The RIS may be an array of passive or active and reconfigurable reflecting elements. A RIS may also be referred to as a metasurface, an intelligent reflection surface (IRS) or a reflectarray. The RIS may steer signaling by adjusting the reflecting elements to direct a received signal towards the UE. Implementing the RIS in the wireless communications system may improve spectral efficiency by circumventing obstructions via new multi-link paths for the signaling. For communications with the UE located in a near field region of the RIS, a received power at any point in the near field region of the RIS is a function of an angle and a distance to the UE. A boundary of a near field region of a RIS may be given by $$L = \frac{2D^2}{\lambda}$$

in classical Fraunhofer formulation, where D is the largest dimension of the RIS and $\lambda$ is the wavelength of the reflected signal. A link quality of near field communications over RIS assisted links may be improved using beam focusing. For example, a RIS beam (e.g., beam reflected by the RIS) may be focused based on the angle and the distance to the UE from the RIS. High received power in the near field region of the RIS may be useful for some applications other than wireless communications, such as wireless energy transfer and wireless charging. For the near field region of the RIS, high power concentration occurs at focal points and decays rapidly over distance from the RIS. To obtain high received power at the UE, the beam focusing may involve an accurate estimate of the focusing distance of the UE from the RIS.

A network entity may determine a beam focusing distance for the UE located in the near field of region of the RIS to provide high received power at the UE. The beam focusing distance may be determined using reference signals for different test beam focusing distances. The network entity may transmit, to the RIS, a set of reference signals. The RIS may steer the reference signals to the UE via a set of beams having a same angular direction. The beams may have a beam focusing distance selected from a set of beam focusing distances within the near field region of the RIS. The set of beam focusing distances may be a distance raster having varying distance deltas. In another example, the set of beam focusing distances may be two beam focusing distances within the near field region of the RIS. The network entity may transmit control signaling to the RIS indicating the angular direction and the set of beam focusing distances. The UE may receive, from the RIS, the set of reference signals and may transmit, to the network entity (e.g., via the RIS or via a direct link between the UE and the network entity), reference signal received power (RSRP) measurements corresponding to the set of reference signals. The network entity may determine the beam focusing distance for the UE as the beam focusing distance associated with the highest RSRP. In some examples, the network entity may determine the beam focusing distance for the UE based on RSRP measurements associated with two beam focusing distances within the near field region of the RIS by comparing the difference between the RSRP measurements and a delta RSRP raster.

Aspects of the disclosure are initially described in the context of wireless communications systems. Additional aspects of the disclosure are described in the context of wireless communication systems and an example process flow. Aspects of the disclosure are further illustrated by and described with reference to apparatus diagrams, system diagrams, and flowcharts that relate to techniques for distance scanning in a near field region of a RIS.

FIG. 1 shows an example of a wireless communications system 100 that supports techniques for distance scanning in a near field region of a RIS in accordance with various aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack.

The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for distance scanning in a near field region of a RIS as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

Some wireless communications systems, such as the wireless communication system 100, may implement a RIS to steer signaling towards a UE 115. The RIS may be an array of passive and reconfigurable reflecting elements. The RIS may steer signaling by adjusting the reflecting elements to direct a received signal towards the UE. Implementing the RIS in the wireless communications system 100 may improve spectral efficiency by circumventing obstructions via new multi-link paths for the signaling. For communications with the UE 115 located in a near field region of the RIS, a received power at any point in the near field region of the RIS is a function of an angle and a distance to the UE 115. A link quality of near field communications over RIS assisted links may be improved using beam focusing. For example, a RIS beam (e.g., beam reflected by the RIS) may be focused based on the angle and the distance to the UE 115 from the RIS. High received power in the near field region of the RIS may be useful for some applications other than wireless communications, such as wireless energy transfer and wireless charging. For the near field region of the RIS, high power concentration occurs at focal points and decays rapidly over distance from the RIS. To obtain high received power at the UE 115, the beam focusing may involve an accurate estimate of the focusing distance of the UE 115 from the RIS.

The network entity 105 may determine a beam focusing distance for the UE 115 located in the near field of region of the RIS to provide high received power at the UE 115. The beam focusing distance may be determined using reference signals for different test beam focusing distances. The network entity 105 may transmit, to the RIS, a set of reference signals. The RIS may steer the reference signals to the UE 115 via a set of beams having a same angular direction to the UE 115. The beams may have a beam focusing distance selected from a set of beam focusing distances within the near field region of the RIS. The set of beam focusing distances may be a distance raster having varying distance deltas. In another example, the set of beam focusing distances may be two beam focusing distances within the near field region of the RIS. The network entity 105 may transmit control signaling to the RIS indicating the angular direction and the set of beam focusing distances. The UE 115 may receive, from the RIS, the set of reference signals and may transmit, to the network entity 105 (e.g., via the RIS), RSRP measurements corresponding to the set of reference signals. The network entity 105 may determine the beam focusing distance for the UE 115 as the beam focusing distance associated with the highest RSRP. In some examples, the network entity 105 may determine the beam focusing distance for the UE 115 based on RSRP measurements associated with two beam focusing distances within the near field region of the RIS by comparing the difference between the RSRP measurements and a delta RSRP raster.

Figure 2:
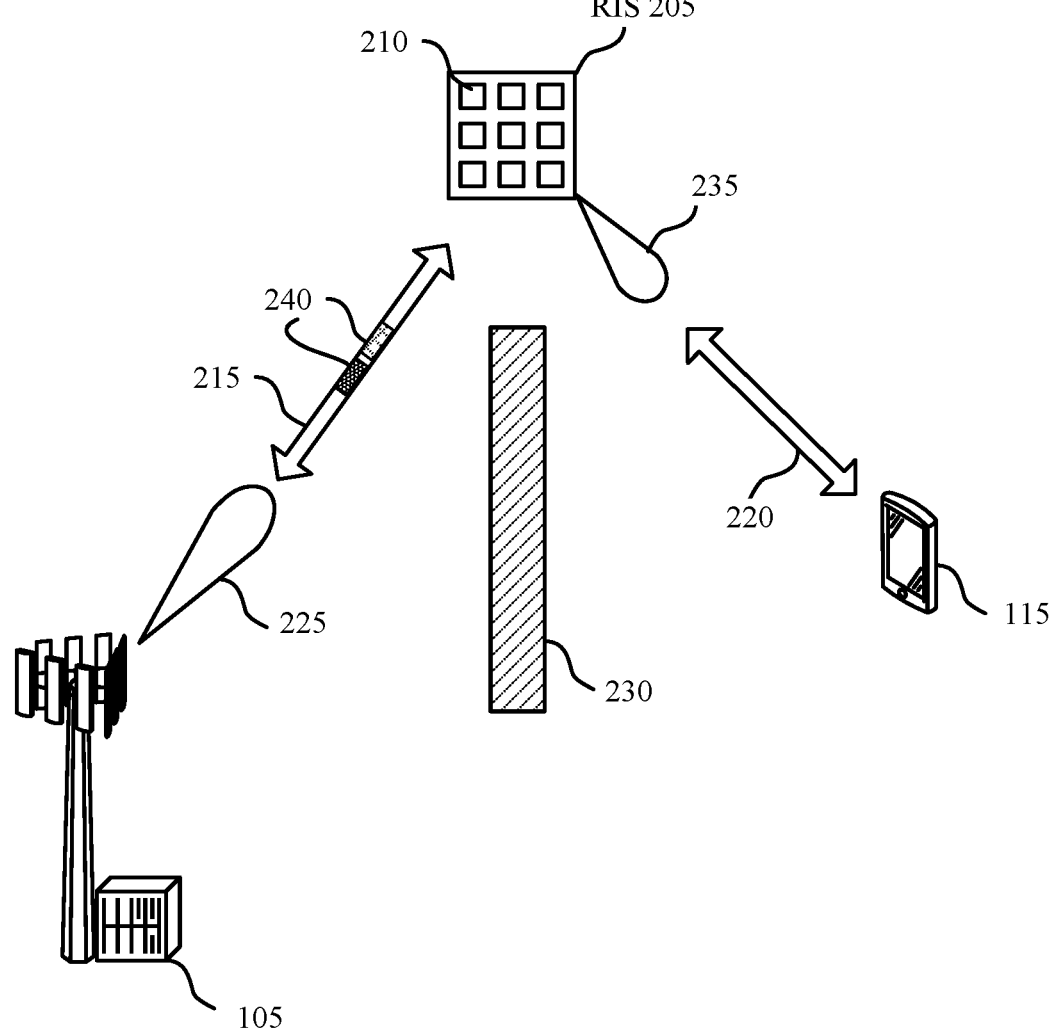
FIG. 2 shows an example of a wireless communications system that supports techniques for distance scanning in a near field region of a RIS in accordance with various aspects of the present disclosure.

FIG. 2 shows an example of a wireless communications system 200 that supports techniques for distance scanning in a near field region of a RIS in accordance with various aspects of the present disclosure. In some examples, wireless communications system 200 may implement aspects of wireless communications system 100. Wireless communications system 200 may include a network entity 105 and a UE 115. The network entity 105 and UE 115 may be examples of corresponding network entities 105 and UEs 115, respectively, as described herein with reference to FIG. 1. The wireless communications system 200 may include a RIS 205, which may be employed within the wireless communications system 200 to extend coverage (e.g., around a blockage), with negligible power consumption (e.g., as compared to an active antenna unit). The RIS 205 may include an array of passive and reconfigurable reflective surface elements 210.

In some cases, the network entity 105 may communicate with the UE 115 via the RIS 205. In some examples, the RIS may be configured to steer or relay (e.g., reflect) signals between the network entities 105 and the UE 115 via the set of reflective surface elements 210. For example, the RIS 205 may be configured to steer signals between the network entity 105 and UE 115 using one or more communication links. For example, the network entity 105 may communicate with the UE 115 via a communication link 215 between the network entity 105 and the RIS 205 and a communication link 220 between the RIS 205 and the UE 115. In some examples, the network entity 105 may be configured to communicate directly with the UE 115 (e.g., without steering or relaying facilitated by the RIS 205).

In some cases, a network entity 105 and a UE 115 may attempt to establish communications with each other using a beamforming technique and via the RIS 205. The RIS 205 may be capable of steering an impinging or incident wave to a desired location in a desired direction. As illustrated by the wireless communications system 200, a network entity 105 may communicate with a UE 115 by using a RIS 205 to reflect one or more beams, such as a beam 225, to the UE 115 around an object 230. In some cases, the object 230 may block or otherwise inhibits a line-of-sight (LoS) link between the network entity 105 and the UE 115. The beam 225 from the network entity 105 may be steered by the RIS 205. The RIS 205 may include a control unit (RIS CU) that may steer the beam 225 by configuring a reflection characteristic of the RIS 205 to control the reflection direction or angular direction from the RIS 205. For example, the RIS CU may control the one or more reflective elements 210 of the RIS 205 to provide a beam (referred to as a RIS beam 235) from the RIS 205 to the UE 115.

In some examples, the network entity 105 may configure or control the RIS 205, such that the network entity 105 may effectively configure or control the angular direction and focus distance of the RIS beam 235. For example, a network entity 105 may transmit control signaling 240 to the RIS CU of the RIS 205 indicating a configuration of the RIS 205 and the RIS CU may configure the RIS 205 accordingly. In some examples, the network entity may receive control signaling from the RIS 205 (e.g., RIS CU) indicating attributes of the RIS 205, such as aperture size, element spacing and communication settings (e.g., frequency).

In some examples, the RIS 205 may function similarly to a mirror or other reflective surface in its ability to reflect the beam 225 or other waves (such as light waves), but may differ in that the RIS 205 may include one or more components that may control how a beam 225 or wave is reflected (such that an angle of incidence can be different than an angle of reflection). Additionally, or alternatively, the RIS 205 may control a shape of a reflected beam (referred to as the RIS beam 235) or wave, such as via energy focusing or energy nulling via constructive interference or destructive interference, respectively. For example, a RIS 205 may include a quantity of reflective elements 210 that each have a controllable delay, phase, or polarization, or any combination thereof. The RIS CU may configure each of the reflective elements 210 to control how the beam 225 or wave may be reflected or to control a shape of the RIS beam 235 or wave. For example, the RIS 205 may steer the beam 225 in a specified angular direction with a specified beam focusing distance as the RIS beam 235.

In some examples, the RIS 205 may be an example of or may otherwise be referred to as a software-controlled metasurface, a configurable reflective surface, a reflective intelligent surface, or a configurable intelligent surface, and may sometimes be a metal surface (e.g., a copper surface) including a quantity of reflective elements 210. In some aspects, the RIS CU may incorporated with the RIS 205 or the RIS CU may be coupled with the RIS 205 via hardware (such as via a fiber optic cable). In some other aspects, the RIS CU may be non-co-located with a RIS 205 and may configure the RIS 205 via over-the-air signaling.

In some examples, the UE 115 may be located in a near field region of the RIS 205. The near field region of the RIS 205 may be dependent on attributes of the RIS, such as such as aperture size, element spacing and communication settings (e.g., 2D frequency). A boundary of a near field region of a RIS may be given by $L=$, where D is the largest dimension of the RIS and X is the wavelength of the reflected signal. The UE 115 may be located between a near field boundary and the RIS 205 to be located within the near field region.

A received power at any point in the near field region of the RIS 205 is a function of an angle and a distance to the UE 115. A link quality of near field communications over RIS assisted communication links 215 and 220 may be improved using beam focusing. For example, the RIS beam 235 may be focused based on the angle and the distance to the UE 115 from the RIS 205. That is, the RIS may steer the beam 225 in an angular direction and at a focusing distance as RIS beam 235. High received power in the near field region of the RIS 205 may be useful for some applications other than wireless communications, such as wireless energy transfer and wireless charging. For the near field region of the RIS 205, high power concentration occurs at focal points and decays rapidly over distance from the RIS 205. To obtain high received power at the UE 115, the beam focusing may involve an accurate estimate of the focusing distance of the UE 115 from the RIS 205.

Figure 3:
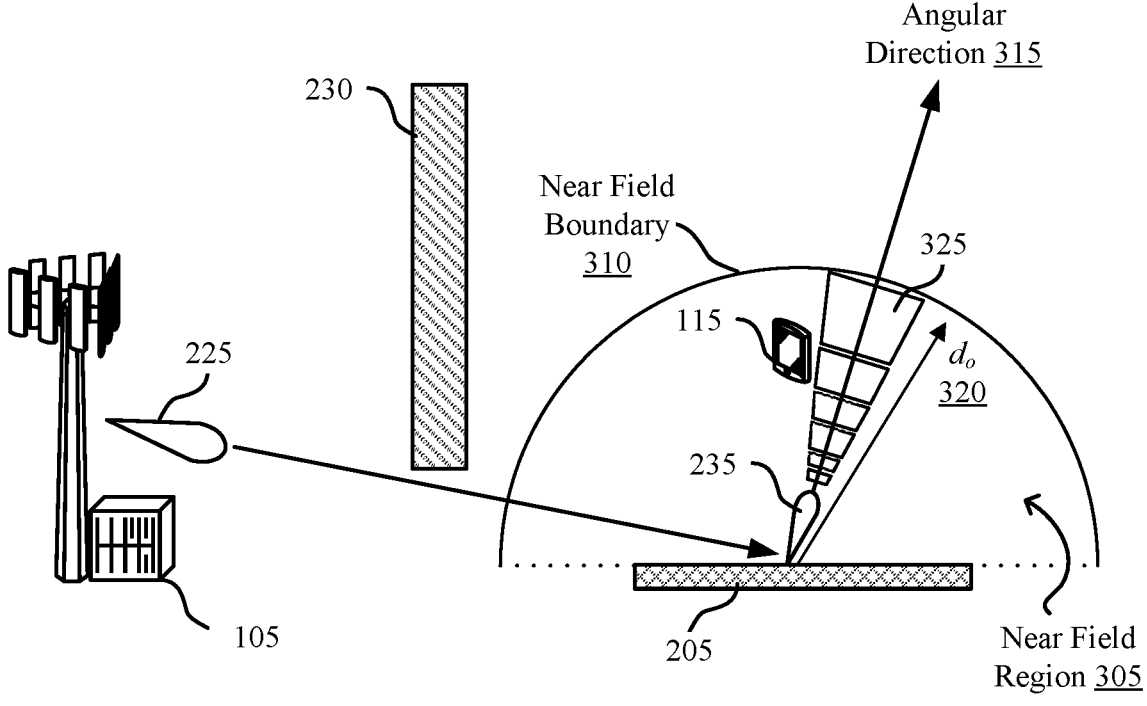
FIG. 3 shows an example of a wireless communications system that supports techniques for distance scanning in a near field region of a RIS in accordance with various aspects of the present disclosure.

FIG. 3 shows an example of a wireless communications system 300 that supports techniques for distance scanning in a near field region of a RIS in accordance with various aspects of the present disclosure. In some examples, wireless communications system 300 may implement aspects of wireless communications systems 100 and 200. Wireless communications system 300 may include a network entity 105, a UE 115 and a RIS 205. The network entity 105 and the UE 115 may be examples of corresponding network entities 105 and UEs 115, respectively, as described herein with reference to FIGS. 1 and 2. The RIS 205 may be an example of corresponding RIS 205, as described herein with reference to FIG. 2. In some examples, the wireless communications system 300 may support the network entity 105 determining a beam focusing distance for the UE 115 located in a near field of region 305 of the RIS 205 to provide high received power at the UE 115.

In some examples, the network entity 105 may communicate with the UE 115 via the RIS 205. The RIS 205 may be configured to steer signals between the network entity 105 and the UE 115. For the illustrated example, the UE 115 is located in the near field region 305 of the RIS 205. The near field region 305 of the RIS 205 is defined as the region between a near field boundary 310 and the RIS 205. In some cases, a network entity 105 and a UE 115 may establish communications with each other using beam focusing techniques via the RIS 205. As illustrated by the wireless communications system 300, a network entity 105 may communicate with a UE 115 by using a RIS 205 to steer one or more signals, such as a beam 225, to the UE 115 around an object 230. The signal, such as the beam 225 from the network entity 105, may be steered by the RIS 205 via a RIS beam 235. The RIS beam 235 may be configured to have an angular direction 315 and a beam focusing distance 320 (e.g., $d_o$) within the near field region 305 of the RIS 205.

In some examples, the network entity 105 may determine a beam focusing distance for the UE 115 located in a near field of region 305 of the RIS 205 to provide high received power at the UE 115. The beam focusing distance may be determined using reference signals for different test beam focusing distances. For example, the distance range in the near field region 305 along the angular direction 315 may be scanned by multiple RIS beams. Each RIS beam 235 may be formed using beam focusing with the same angle information or angular direction 315 with a different predetermined distance to focus. For example, the network entity 105 may transmit, to the RIS 205, a set of reference signals. The RIS 205 may steer, to the UE 115, the set of reference signals via a set of RIS beams. Each RIS beam 235 of the set of RIS beams may have a beam focusing distance selected from a set of beam focusing distances within the near field region 305. The UE 115 may receive, from the RIS 205, the set of reference signals and may transmit, to the network entity 105 (via the RIS 205), RSRP measurements corresponding to the set of reference signals. The network entity 105 may determines the beam focusing distance for the UE 115 as the beam focusing distance associated with the highest RSRP. Once the beam focusing distance for the UE 115 is determined, the network entity 105 may transmit control signaling to the RIS 205 (e.g., RIS CU) to configure the RIS 205 to steer signals to the UE 115 at the determined focusing distance.

In some examples, the set of beam focusing distances within the near field region 305 may be a predefined distance raster (e.g., a set of focusing distances) to scan in the angular direction. The focusing distances in the raster may not have a fixed distance delta. For example, the focusing distances in the raster may be chosen using a higher-order polynomial, such as quadrature, third-order or exponential with varying distance delta.

As shown in FIG. 3, a region 325 represents an area covered by one of the RIS beams 235 with a specified focusing distance. Each region 325 associated with a single RIS beam 235 may be shorter for the focusing distance closer to the RIS 205 because the received power decays more quickly over distance closer to the RIS 205. The number of regions 325 to be scanned using different test beams may be determined based on a change in the received power as compared to an optimal received power value (e.g., received power for a focusing distance that matches distance of the UE 115 from the RIS 205). In some examples, to boost received power in the near field region 305 with minimal gap to the optimal received power value, more test beams with smaller distance deltas may be used to cover focusing distances close to the RIS 205.

In some examples, for codebook-based beam alignment, the network entity 105 may configure the RIS 205 with a phase matrix to generate the set of beams that sweep the desired angular region for a given range of focusing distances. The network entity 105 may transmit, to the RIS 205, control signaling indicating the phase matrix, and the phase matrix may indicate the angular direction for the set of test beams. For any direction from the codebook, the focusing distance within the near field region 305 may be scanned or covered using multiple test beams, each of which is focused to a predefined distance chosen from the focusing distance raster or set of focusing distances. The network entity 105 may determine the focusing distance raster using the RIS 205 attributes (e.g., aperture size, element spacing) and communication setting (e.g., frequency). In some examples, the RIS 205 may inform the network entity 105 of its attributes to enable the network entity 105 determine the focusing distances and angular direction. For example, the RIS 205, such as via the RIS CU, may transmit control signaling to the network entity indicating the RIS attributes such as during initial handshaking.

In some examples, the network entity 105 may transmit control signaling to the RIS 205 (e.g., to the RIS CU) indicating the angular direction for the set of test beams. In another example, the network entity 105 may transmit control signaling indicating the set of beam focusing distances or the focusing distance raster. In a further example, the control signaling indicating the set of beam focusing distances may indicate the set of beam focusing distances from a codebook. The RIS 205 may produce the RIS beams using the set of focusing distances from the focusing distance raster provided by the network entity 105 or from a set of codebook entries.

In some examples, the network entity 105 may transmit control signaling indicating that a subset of the focusing distances in the raster be used, such as when a part of the near field region 305 may be of interest. In this example, the network entity 105 may transmit control signaling indicating the subset of beam focusing distance to scan the desired region of interest to the RIS 205, such as by indicating corresponding indices in the codebook. The UE 115 characteristic may remain the same during each implementation of the focusing distance scanning from the distance raster.

Figure 4:
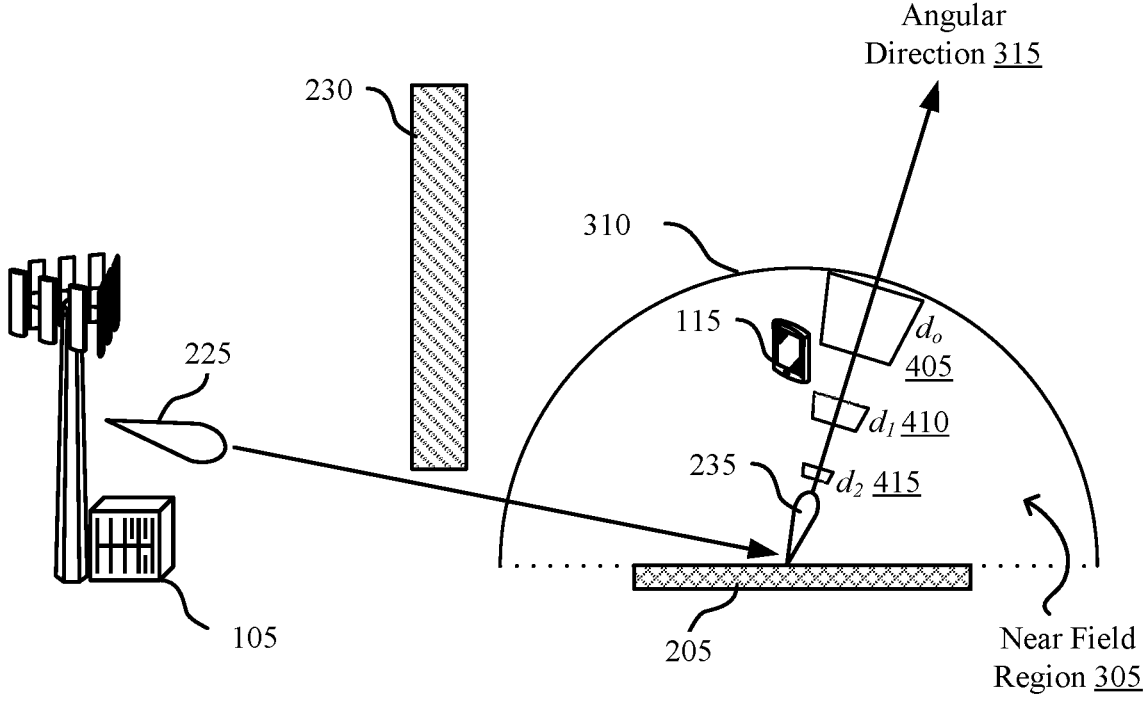
FIG. 4 shows an example of a wireless communications system that supports techniques for distance scanning in a near field region of a RIS in accordance with various aspects of the present disclosure.

FIG. 4 shows an example of a wireless communications system 400 that supports techniques for distance scanning in a near field region of a RIS in accordance with various aspects of the present disclosure. In some examples, wireless communications system 400 may implement aspects of wireless communications systems 100, 200 and 300. Wireless communications system 400 may include a network entity 105, a UE 115 and a RIS 205. The network entity 105 and the UE 115 may be examples of corresponding network entities 105 and UEs 115, respectively, as described herein with reference to FIGS. 1, 2 and 3. The RIS 205 may be an example of corresponding RIS 205, as described herein with reference to FIGS. 2 and 3. In some examples, the wireless communications system 400 may support the network entity 105 determining a beam focusing distance for the UE 115 located in a near field of region of the RIS 205 to provide high received power at the UE 115.

In some examples, the network entity 105 may communicate with the UE 115 via the RIS 205. The RIS may be configured to steer signals between the network entity 105 and the UE 115. For the illustrated example, the UE 115 is located in a near field region 305 of the RIS 205. The near field region 305 is defined with a near field boundary 310. In some cases, the network entity 105 and the UE 115 may establish communications with each other using beam focusing techniques via the RIS 205. As illustrated by the wireless communications system 400, a network entity 105 may communicate with a UE 115 by using a RIS 205 to steer one or more signals, such as a beam 225, to the UE 115 around an object 230. The signal, such as the beam 225 from the network entity 105 may be steered by the RIS 205 via RIS beam 235. The RIS beam 235 may be configured to have an angular direction 315 and a beam focusing distance, such as a first beam focusing distance $d_o$ 405, a second beam focusing distance $d_1$ 410 and a third beam focusing distance $d_2$ 415 within the near field region 305 of the RIS 205.

In some examples, the network entity 105 may determine the beam focusing distance for the UE 115 located in a near field of region 305 of the RIS 205 to provide high received power at the UE 115. For example, a dynamic distance scanning technique may be used to determine the focusing distance to the UE 115 rather than scanning all of the focusing distances in the focusing distance raster. That is, rather than using each of the focusing distances of the focusing distance raster as few as two focusing distances may be used.

For example, the network entity 105 may transmit a first reference signal and a second reference signal to the RIS 205. The RIS 205 may steer the first reference signal via a first beam having a first beam focusing distance, such as a first beam focusing distance $d_o$ 405, and may steer the second reference signal via a second beam having a second beam focusing distance, such as second beam focusing distance $d_1$ 410. The UE 115 may receive the first reference signal and the second reference signal and may transmit, to the network entity UE 115 (via the RIS 205), a first RSRP value corresponding to the first reference signal and a second RSRP value corresponding to the second reference signal. The network entity 105 may compute a difference between the first RSRP value and the second RSTP value and may identify the beam focusing distance for the UE 115 by comparing the difference to a delta RSRP power raster.

In some examples, the network entity 105 may use a relative RSRP-based power raster (e.g., delta RSRP power raster) to determine the focusing distance of the UE 115 in the near field region 305. For the dynamic technique, the network entity 105 may compare the first RSRP value and the second RSRP value and may use numerical interpolation over the RSRP power raster to determine the beam focusing distance for the UE 115.

The dynamic technique using as few as two references signals via two test beams at two focusing distances may have less beam overhead than the fixed distance raster technique described in connection with FIG. 3. The network entity 105 may skip many beam focusing distances included in the focusing distance raster with the dynamic technique. For example, beam focusing distances of the beam focusing distance raster between the first beam focusing distance $d_o$ 405 and the second beam focusing distance $d_1$ 410 may be skipped, and beam focusing distances of the beam focusing distance raster between the second beam focusing distance $d_1$ 410 and the third beam focusing distance $d_2$ 415 may be skipped. Additionally, beam focusing distances close to the RIS 205 and beam focusing distances near the near field boundary 310 may also be skipped.

The dynamic scanning technique may be illustrated with the following example. An example RIS 205 may be an outdoor RIS with 200 by 200 reflective elements with $\lambda/2$ element spacing with $\lambda=1$ centimeter (cm), which is of 1 meter (m) by 1 m aperture surface and 4 subsurfaces of 0.5 m by 0.5 m each and frequency of 28 GHz. For the example RIS 205, the received power at the UE 115 for the first beam focusing distance 405 of $d_o=60$ m (independent of actual UE distance) may be superior to beam forming over all the distances up until 250 m (both in the near field region 305 and the far field). However, a received power gap to optimal received power (e.g., received power if focusing distance is the exact UE distance) may be as high as 20 dB for the focusing distance below 40 m in the near field region 305. To boost received power within 40 m of RIS 205, the distance scanning strategy may use the relative RSRP-based power raster.

For example, the network entity 105 may send a first reference signal that the RIS 205 steers via a first beam having a first beam focusing distance $d_o=60$ m, the network entity 105 may send a second reference signal that the RIS 205 steers via a second beam having a second beam focusing distance $d_1=30$ m, and may send a third reference signal that the RIS 205 steers via a third beam having a third beam focusing distance $d_2=5.5$ m, which may ensures no considerable received-power gap from the optimal received power. These beams may be scheduled sufficiently close in time so that the beams experience similar channel conditions.

The network entity 105 may receive, from the UE 115 via the RIS 205, the first RSRP measurement corresponding to the first reference signal, the second RSRP measurement corresponding to the second reference signal and the third RSRP measurement corresponding to the third reference signal. The network entity 105 may compute the RSRP difference between the first RSRP measurement and the second RSRP measurement (to find the focusing distance if the UE 115 is located between 10 m and 40 m from the RIS 205) or may compute the RSRP difference between the first RSRP measurement and the third RSRP measurement (to find the focusing distance if the UE 115 is located between 60 m and 30 m from the RIS 205). After computing the RSRP difference, the network entity 105 may compare the RSRP difference with the delta RSPR raster to determine the focusing distance for the UE 115 via numerical interpolation. The delta RSRP may be precomputed offline based on the RIS attributes.

In some examples, the network entity 105 may determine a minimum number of distances (other than $d_1$ and $d_2$) to be used in interpolation, for which the respective beams achieve the optimal receive power. For example, focusing distances of {10 m, 12 m, 15 m, 20 m} may be used in interpolation for the UE 115 located between 10 m and 40 m from the RIS 205, and focusing distance of {6 m, 7 m, 8 m, 9 m} may be used in interpolation for the UE 115 located between 5.5 m and 10 m from the RIS 205. For each of these distances, an interval of RIS 205 to UE 115 distance over which the respective beam achieves the highest receive power is then determined which may be between 17 m and 23.5 m for focusing distance of 20 m. For example, the delta RSRP raster may provide delta RSRP values [2.3 dB, 4.2 dB] for 17 m and 23.5 m. In this example, the network entity 105 may select the focusing distance to be 20 m whenever the computed RSRP difference is in the range of [2.3 dB, 4.2 dB].

In this example, the network entity 105 may determine the focusing distance to the UE 115 to be 20 m. As a result, although the test beam for the focusing distance of 20 m was not sent, this beam focusing distance may selected based on RSRP measurements for the beams with a focusing distance of 60 m, 30 m, and 5.5 m. If the near field range below 10 m is not of any interest, then the delta RSRP for 60 m and 30 m is sufficient, which further cuts down on beam overhead.

Figure 5:
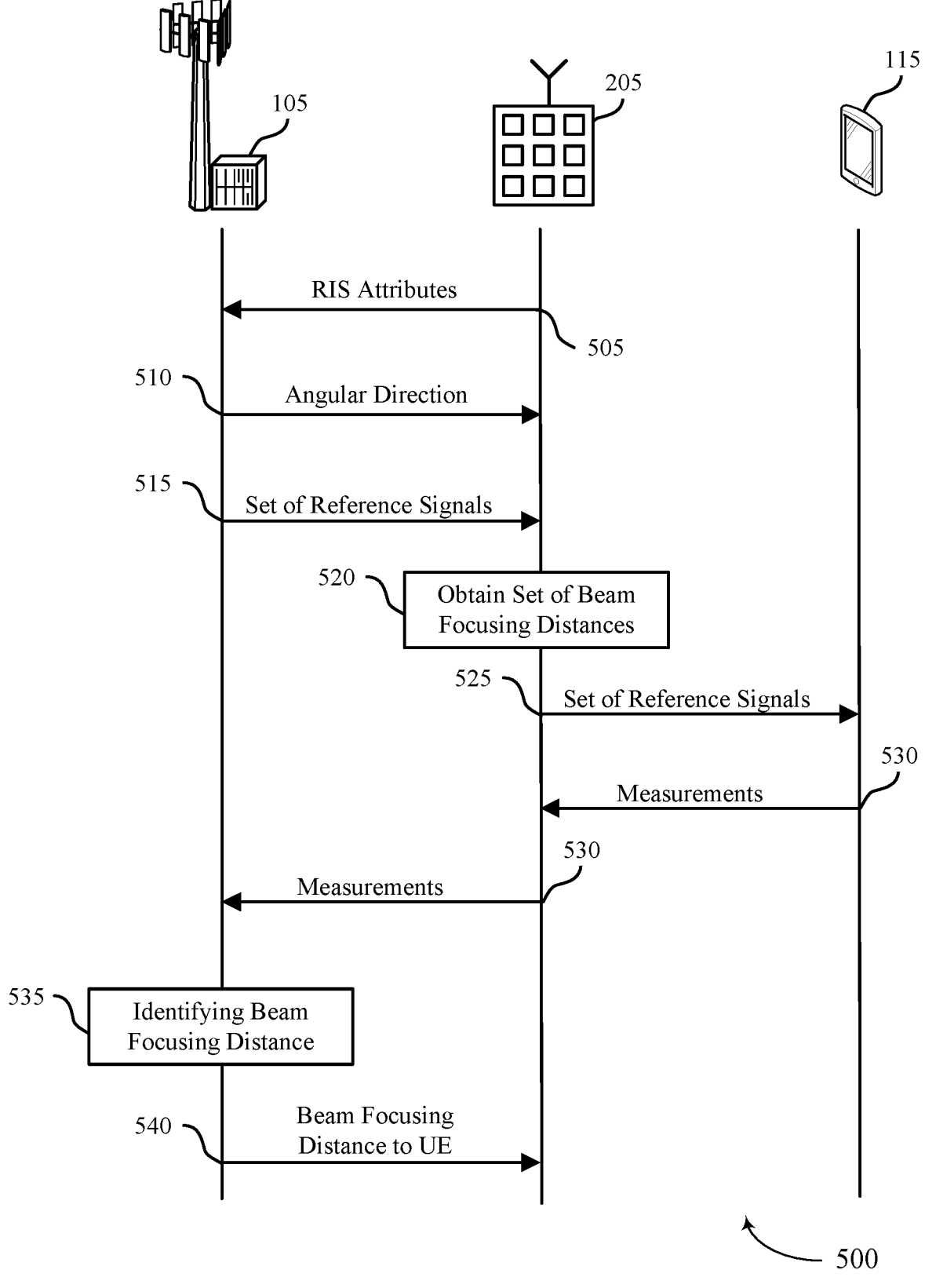
FIG. 5 shows an example of a process flow that supports techniques for distance scanning in a near field region of a RIS in accordance with various aspects of the present disclosure.

FIG. 5 shows an example of a process flow 500 that supports techniques for distance scanning in a near field region of a RIS in accordance with various aspects of the present disclosure. The process flow 500 may include a network entity 105, a RIS 205 and a UE 115. The network entity 105 may be an example of the network entity 105 described herein with respect to FIGS. 1, 2, 3 and 4. The RIS 205 may be an example of the RIS 205 described herein with respect to FIGS. 2, 3 and 4. The UE 115 may be an example of the UE 115 described herein with respect to FIGS. 1, 2, 3 and 4. In the following description of the process flow 500, the operations between the network entity 105, the RIS 205 and the UE 115 may be transmitted in a different order than the example order shown, or the operations performed by the network entity 105, the RIS 205 and the UE 115 may be performed in different orders or at different times. Some operations may also be omitted from the process flow 500, and other operations may be added to the process flow 500.

In some examples, at 505, the RIS 205 may transmit, to a network entity 105, control signaling indicating attributes of the RIS 205. In some examples, at 510, the network entity 105 may transmit, to the RIS 205, first control signaling indicating an angular direction for a set of beams. In some examples, the network entity 105 may transmit, to the RIS 205, control signaling indicating a phase matrix. The phase matrix may indicate the angular direction for the set of beams.

At 515, the network entity 105 may transmit, to the RIS 205, a set of reference signals. In some examples, at 520, the RIS 205, may obtain a set of beam focusing distances. Each beam focusing distance of the set of beam focusing distances may be within a near field region of the RIS 205. In some examples, the RIS 205 may obtain the set of beam focusing distances from a codebook. In another example, the RIS 205 may receive, from the network entity 105, second control signaling indicating the set of beam focusing distances. In some examples, the second control signaling may indicate the set of beam focusing distance from a codebook. In some examples, the set of beam focusing distances may be based on the attributes of the RIS. In some examples, the set of beam focusing distances comprise varying distance deltas.

At 525, the RIS 205 may steer, to the UE 115, the set of reference signals via a set of beams. Each beam of the set of beams has a respective beam focusing distance selected from the set of beam focusing distances within the near field region of the RIS 205. In some examples, the set of beams may include a first beam having a first beam focusing distance and a second beam having a second beam focusing distance. The RIS 205 may steer the set of beams in the angular direction.

At 530, the UE 115 may transmit, to the network entity 105 (via the RIS 205 or via a direct connection between the UE 115 and the network entity 105), measurements for the set of reference signals. In some examples, the measurements for the set of reference signals may be a set of RSRP values corresponding to the set of reference signals. In some examples, the measurements may include a first RSRP associated with the first reference signal and a second RSRP associated with a second reference signal.

At 535, the network entity 105 may identify the beam focusing distance for the UE 115. At 540, the network entity 105 may transmit, to the RIS 205, a beam focusing distance for the UE 115. The network entity 105 may subsequently communicate with the UE 115 via the RIS using the beam focusing distance at the RIS 205 for the UE 115.

Figure 6:
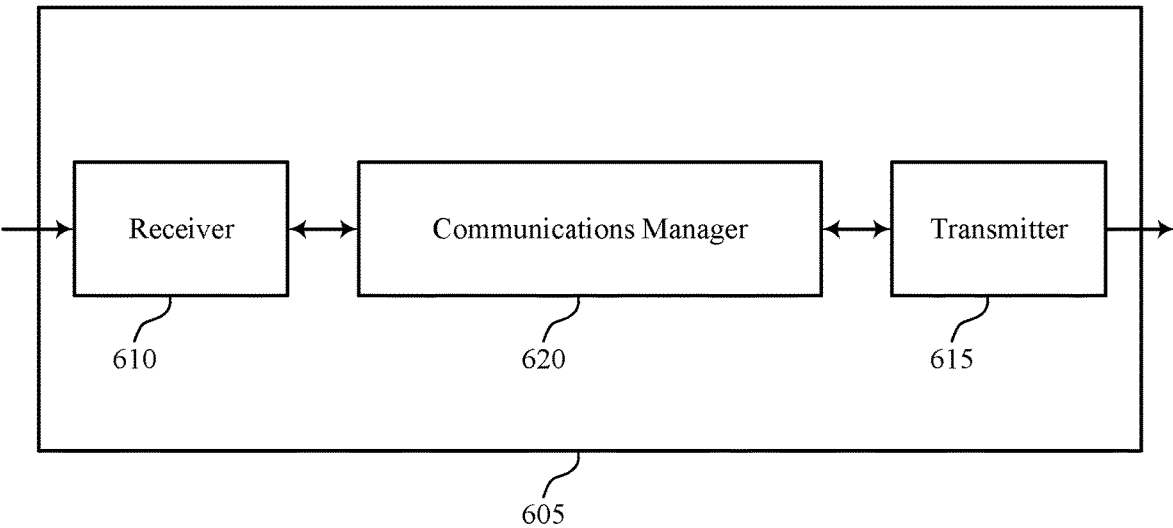
FIGS. 6 and 7 show block diagrams of devices that support techniques for distance scanning in a near field region of a RIS in accordance with various aspects of the present disclosure.

FIG. 6 shows a block diagram 600 of a device 605 that supports techniques for distance scanning in a near field region of a RIS in accordance with various aspects of the present disclosure. The device 605 may be an example of aspects of a RIS as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for distance scanning in a near field region of a RIS). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for distance scanning in a near field region of a RIS). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for distance scanning in a near field region of a RIS as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a RIS (RIS) in accordance with examples as disclosed herein. For example, the communications manager 620 is capable of, configured to, or operable to support a means for receiving a set of reference signals. The communications manager 620 is capable of, configured to, or operable to support a means for steering, to a UE, the set of reference signals via a set of beams, each beam of the set of beams having a respective beam focusing distance selected from a set of beam focusing distances within a near field region of the RIS. The communications manager 620 is capable of, configured to, or operable to support a means for receiving, from the UE, measurements for the set of reference signals.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources.

Figure 7:
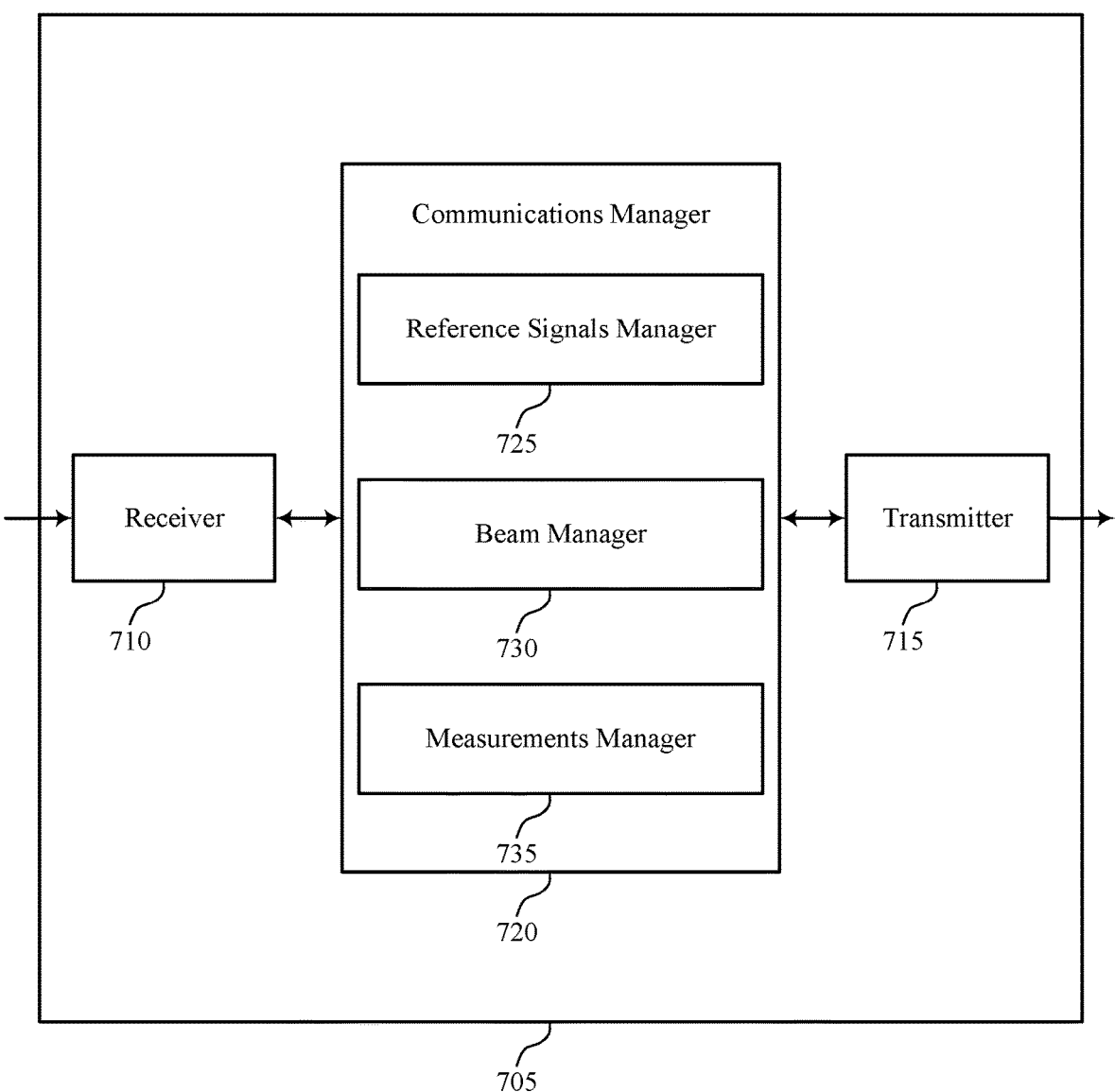

FIG. 7 shows a block diagram 700 of a device 705 that supports techniques for distance scanning in a near field region of a RIS in accordance with various aspects of the present disclosure. The device 705 may be an example of aspects of a device 605 or a RIS as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for distance scanning in a near field region of a RIS). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for distance scanning in a near field region of a RIS). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for distance scanning in a near field region of a RIS as described herein. For example, the communications manager 720 may include a reference signals manager 725, a beam manager 730, a measurements manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a RIS (RIS) in accordance with examples as disclosed herein. The reference signals manager 725 is capable of, configured to, or operable to support a means for receiving a set of reference signals. The beam manager 730 is capable of, configured to, or operable to support a means for steering, to a UE, the set of reference signals via a set of beams, each beam of the set of beams having a respective beam focusing distance selected from a set of beam focusing distances within a near field region of the RIS. The measurements manager 735 is capable of, configured to, or operable to support a means for receiving, from the UE, measurements for the set of reference signals.

Figure 8:
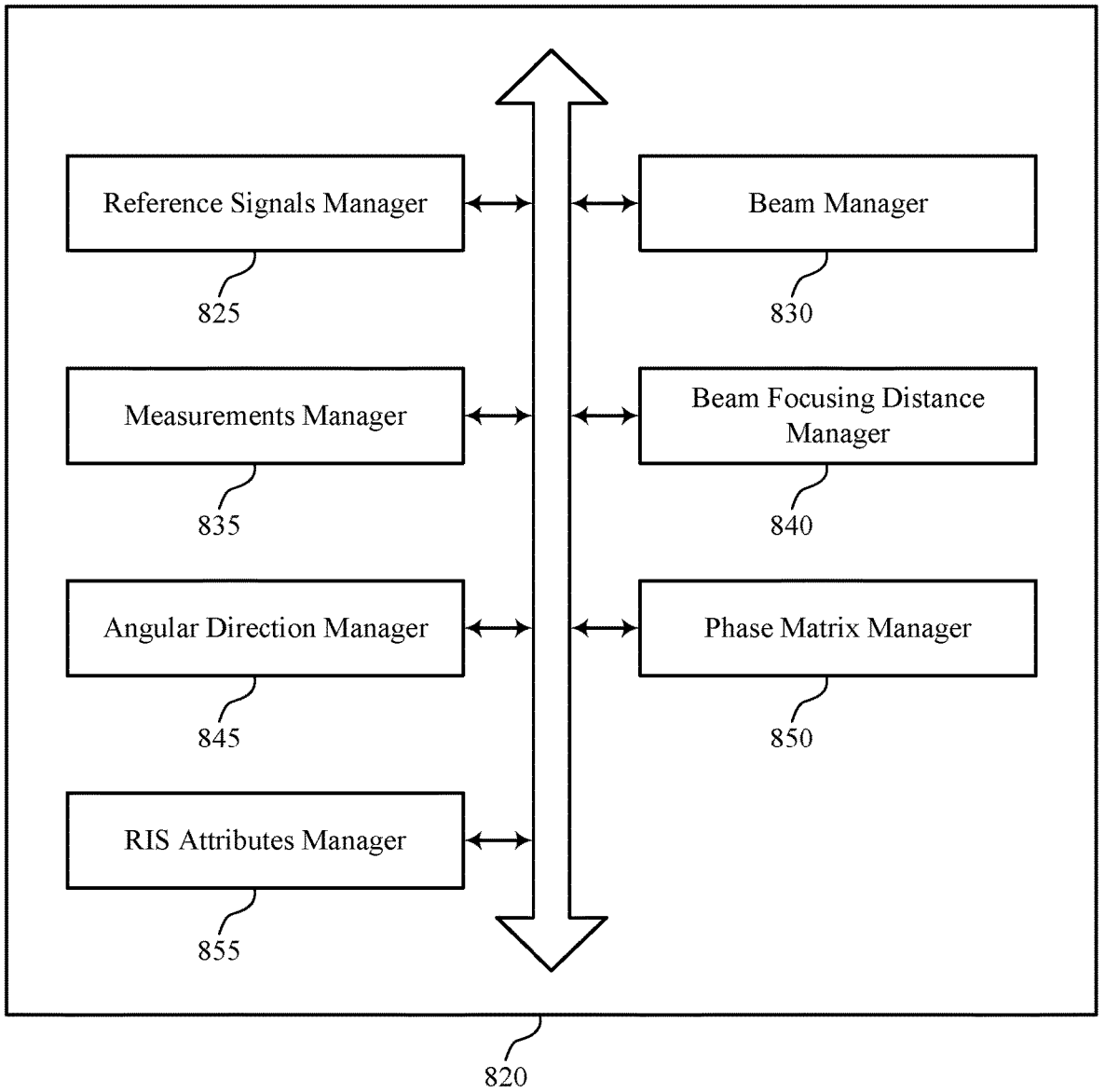
FIG. 8 shows a block diagram of a communications manager that supports techniques for distance scanning in a near field region of a RIS in accordance with various aspects of the present disclosure.

FIG. 8 shows a block diagram 800 of a communications manager 820 that supports techniques for distance scanning in a near field region of a RIS in accordance with various aspects of the present disclosure. The communications manager 820 may be an example of aspects of a communications manager 620, a communications manager 720, or both, as described herein. The communications manager 820, or various components thereof, may be an example of means for performing various aspects of techniques for distance scanning in a near field region of a RIS as described herein. For example, the communications manager 820 may include a reference signals manager 825, a beam manager 830, a measurements manager 835, a beam focusing distance manager 840, an angular direction manager 845, a phase matrix manager 850, a RIS attributes manager 855, or any combination thereof. Each of these components may communicate, directly or indirectly, with one another (e.g., via one or more buses).

The communications manager 820 may support wireless communication at a RIS (RIS) in accordance with examples as disclosed herein. The reference signals manager 825 is capable of, configured to, or operable to support a means for receiving a set of reference signals. The beam manager 830 is capable of, configured to, or operable to support a means for steering, to a UE, the set of reference signals via a set of beams, each beam of the set of beams having a respective beam focusing distance selected from a set of beam focusing distances within a near field region of the RIS. The measurements manager 835 is capable of, configured to, or operable to support a means for receiving, from the UE, measurements for the set of reference signals.

In some examples, the measurements manager 835 is capable of, configured to, or operable to support a means for transmitting, to a network entity, the measurements for the set of reference signals.

In some examples, the beam focusing distance manager 840 is capable of, configured to, or operable to support a means for receiving, from a network entity, an indication of a beam focusing distance for the UE based on the measurements.

In some examples, the set of beam focusing distances include varying distance deltas.

In some examples, the angular direction manager 845 is capable of, configured to, or operable to support a means for receiving, from a network entity, first control signaling indicating an angular direction for the set of beams.

In some examples, to support steering the set of reference signals via the set of beams, the beam manager 830 is capable of, configured to, or operable to support a means for steering the set of beams in the angular direction.

In some examples, to support steering the set of reference signals via the set of beams, the beam manager 830 is capable of, configured to, or operable to support a means for obtaining the set of beam focusing distances from a codebook.

In some examples, the phase matrix manager 850 is capable of, configured to, or operable to support a means for receiving, from a network entity, third control signaling indicating a phase matrix, where the phase matrix indicating an angular direction for the set of beams.

In some examples, the RIS attributes manager 855 is capable of, configured to, or operable to support a means for transmitting, to a network entity, control signaling indicating attributes of the RIS.

In some examples, to support set of beams, the beam manager 830 is capable of, configured to, or operable to support a means for a first beam having a first beam focusing distance and a second beam having a second beam focusing distance.

In some examples, the beam manager 830 is capable of, configured to, or operable to support a means for receiving, from a network entity, second control signaling indicating the set of beam focusing distances.

In some examples, the second control signaling indicating the set of beam focusing distances from a codebook.

Figure 9:
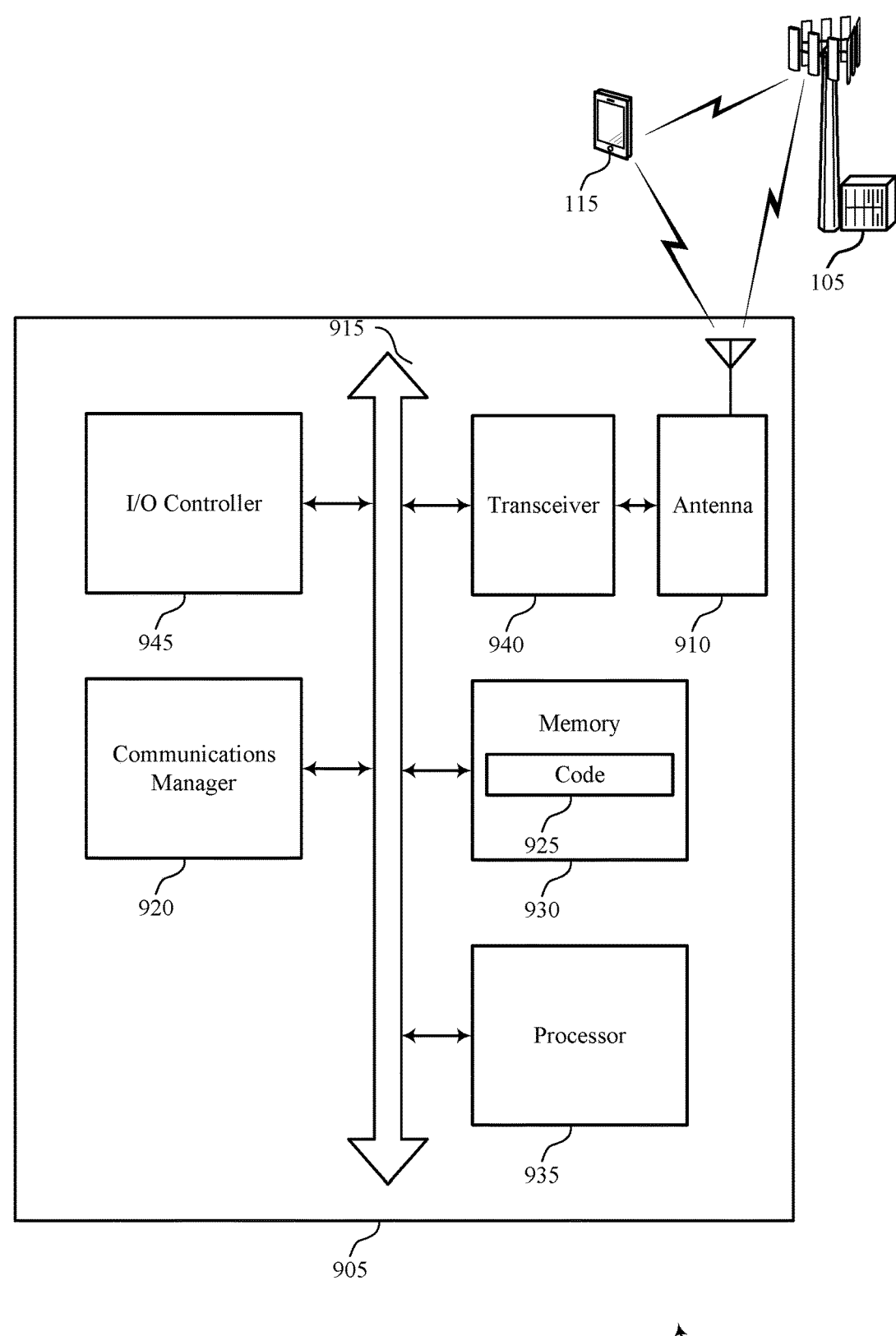
FIG. 9 shows a diagram of a system including a device that supports techniques for distance scanning in a near field region of a RIS in accordance with various aspects of the present disclosure.

FIG. 9 shows a diagram of a system 900 including a device 905 that supports techniques for distance scanning in a near field region of a RIS in accordance with various aspects of the present disclosure. The device 905 may be an example of or include the components of a device 605, a device 705, or a RIS as described herein. The device 905 may include components for bi-directional voice and data communications including components for transmitting and receiving communications, such as a communications manager 920, an antenna 910, an input/output (I/O) controller 945, code 925, a memory 930, a processor 935, and a transceiver 940. These components may be in electronic communication or otherwise coupled (e.g., operatively, communicatively, functionally, electronically, electrically) via one or more buses (e.g., a bus 915).

The memory 930 may include RAM and ROM. The memory 930 may store computer-readable, computer-executable code 925 including instructions that, when executed by the processor 935, cause the device 905 to perform various functions described herein. The code 925 may be stored in a non-transitory computer-readable medium such as system memory or another type of memory. In some cases, the code 925 may not be directly executable by the processor 935 but may cause a computer (e.g., when compiled and executed) to perform functions described herein. In some cases, the memory 930 may contain, among other things, a BIOS which may control basic hardware or software operation such as the interaction with peripheral components or devices.

The processor 935 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In some other cases, a memory controller may be integrated into the processor 935. The processor 935 may be configured to execute computer-readable instructions stored in a memory (e.g., the memory 930) to cause the device 905 to perform various functions (e.g., functions or tasks supporting techniques for distance scanning in a near field region of a RIS). For example, the device 905 or a component of the device 905 may include a processor 935 and memory 930 coupled with or to the processor 935, the processor 935 and memory 930 configured to perform various functions described herein.

In some cases, the device 905 may include a single antenna 910. However, in some other cases, the device 905 may have more than one antenna 910, which may be capable of concurrently transmitting or receiving multiple wireless transmissions. The transceiver 940 may communicate bi-directionally, via the one or more antennas 910, wired, or wireless links as described herein. For example, the transceiver 940 may represent a wireless transceiver and may communicate bi-directionally with another wireless transceiver. The transceiver 940 may also include a modem to modulate the packets, to provide the modulated packets to one or more antennas 910 for transmission, and to demodulate packets received from the one or more antennas 910. The transceiver 940, or the transceiver 940 and one or more antennas 910, may be an example of a transmitter 615, a transmitter 715, a receiver 610, a receiver 710, or any combination thereof or component thereof, as described herein.

The communications manager 920 may support wireless communication at a RIS in accordance with examples as disclosed herein. For example, the communications manager 920 is capable of, configured to, or operable to support a means for receiving a set of reference signals. The communications manager 920 is capable of, configured to, or operable to support a means for steering, to a UE, the set of reference signals via a set of beams, each beam of the set of beams having a respective beam focusing distance selected from a set of beam focusing distances within a near field region of the RIS. The communications manager 920 is capable of, configured to, or operable to support a means for receiving, from the UE, measurements for the set of reference signals.

By including or configuring the communications manager 920 in accordance with examples as described herein, the device 905 may support techniques for improved communication reliability, more efficient utilization of communication resources, improved coordination between devices.

In some examples, the communications manager 920 may be configured to perform various operations (e.g., receiving, monitoring, transmitting) using or otherwise in cooperation with the transceiver 940, the one or more antennas 910, or any combination thereof. Although the communications manager 920 is illustrated as a separate component, in some examples, one or more functions described with reference to the communications manager 920 may be supported by or performed by the processor 935, the memory 930, the code 925, or any combination thereof. For example, the code 925 may include instructions executable by the processor 935 to cause the device 905 to perform various aspects of techniques for distance scanning in a near field region of a RIS as described herein, or the processor 935 and the memory 930 may be otherwise configured to perform or support such operations.

Figure 10:
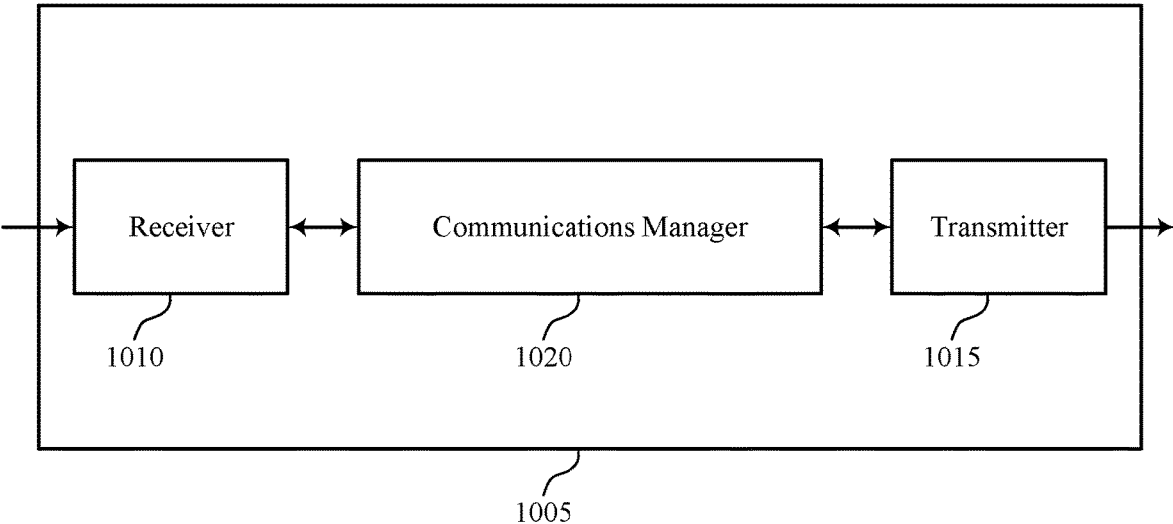
FIGS. 10 and 11 show block diagrams of devices that support techniques for distance scanning in a near field region of a RIS in accordance with various aspects of the present disclosure.

FIG. 10 shows a block diagram 1000 of a device 1005 that supports techniques for distance scanning in a near field region of a RIS in accordance with various aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter

1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for distance scanning in a near field region of a RIS as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 is capable of, configured to, or operable to support a means for transmitting, to a RIS, a set of reference signals for steering by the RIS to a UE via a set of beams, each beam of the set of beams having a respective beam focusing distance selected from a set of beam focusing distances within a near field region of the RIS. The communications manager 1020 is capable of, configured to, or operable to support a means for receiving, from the UE, measurements for the set of reference signals. The communications manager 1020 is capable of, configured to, or operable to support a means for transmitting, to the RIS, an indication of a beam focusing distance for the UE based on the measurements.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources.

Figure 11:
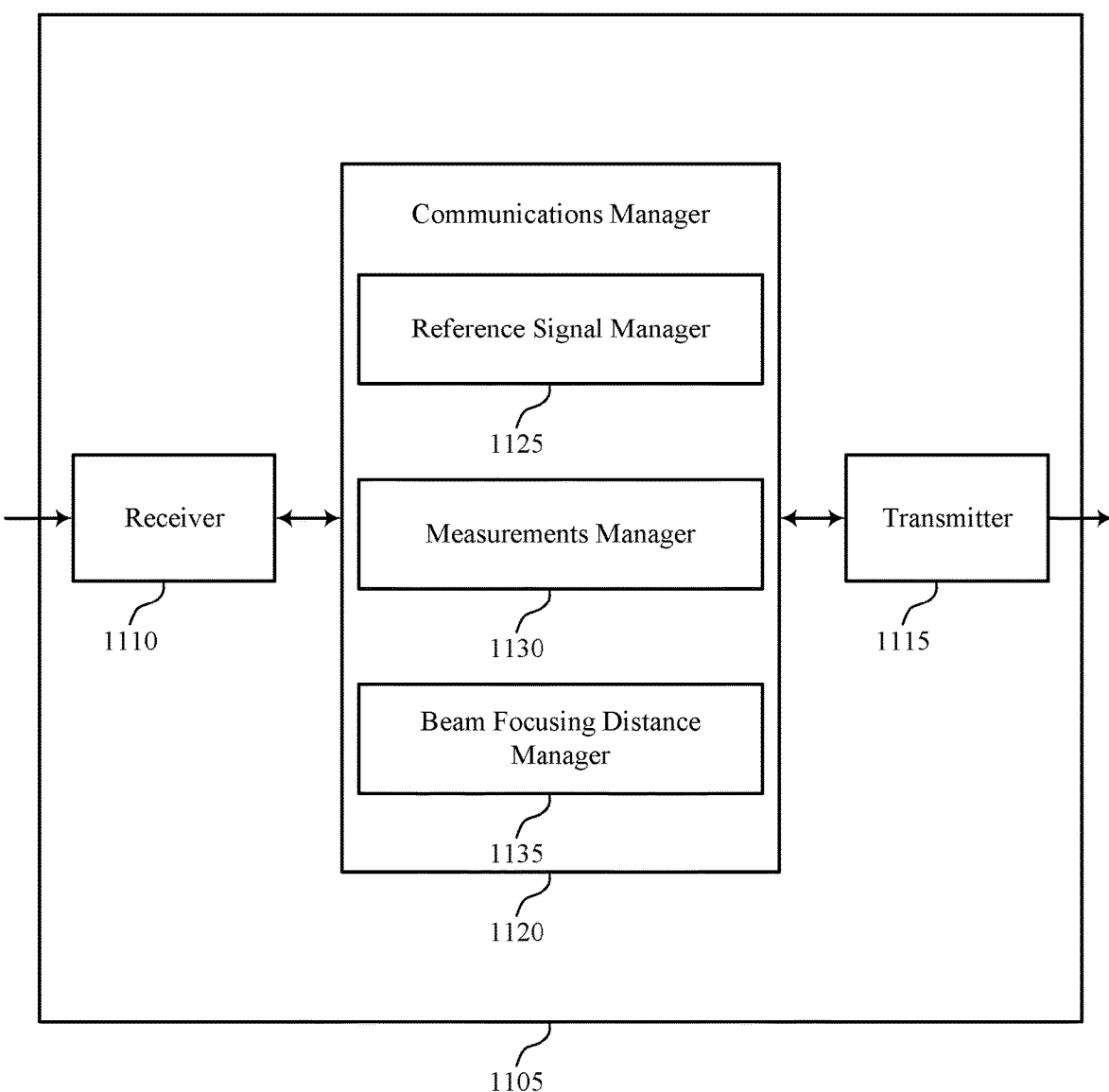

FIG. 11 shows a block diagram 1100 of a device 1105 that supports techniques for distance scanning in a near field region of a RIS in accordance with various aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for distance scanning in a near field region of a RIS as described herein. For example, the communications manager 1120 may include a reference signal manager 1125, a measurements manager 1130, a beam focusing distance manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The reference signal manager 1125 is capable of, configured to, or operable to support a means for transmitting, to a RIS, a set of reference signals for steering by the RIS to a UE via a set of beams, each beam of the set of beams having a respective beam focusing distance selected from a set of beam focusing distances within a near field region of the RIS. The measurements manager 1130 is capable of, configured to, or operable to support a means for receiving, from the UE, measurements for the set of reference signals. The beam focusing distance manager 1135 is capable of, configured to, or operable to support a means for transmitting, to the RIS, an indication of a beam focusing distance for the UE based on the measurements.

Figure 12:
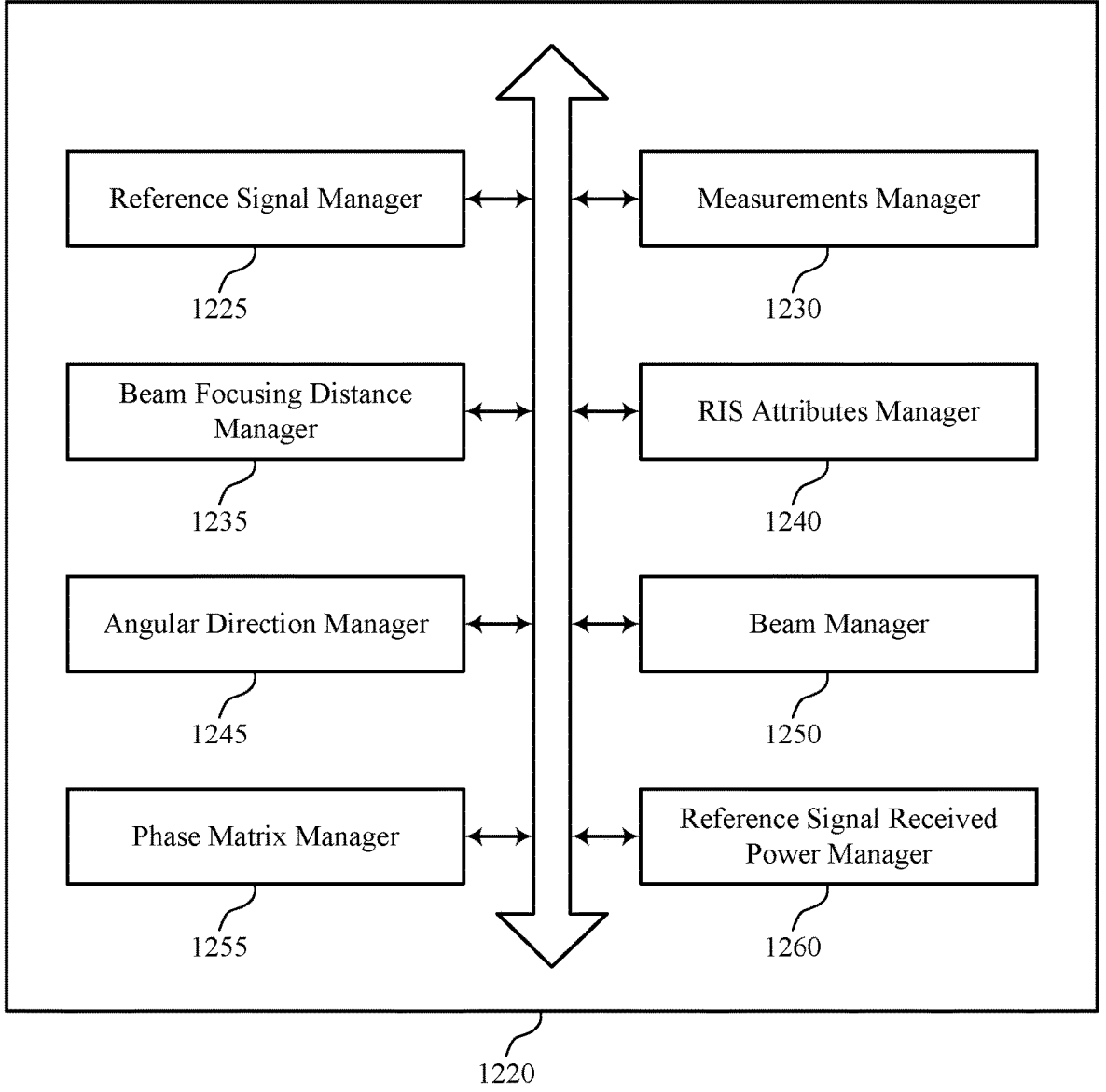
FIG. 12 shows a block diagram of a communications manager that supports techniques for distance scanning in a near field region of a RIS in accordance with various aspects of the present disclosure.

FIG. 12 shows a block diagram 1200 of a communications manager 1220 that supports techniques for distance scanning in a near field region of a RIS in accordance with various aspects of the present disclosure. The communications manager 1220 may be an example of aspects of a communications manager 1020, a communications manager 1120, or both, as described herein. The communications manager 1220, or various components thereof, may be an example of means for performing various aspects of techniques for distance scanning in a near field region of a RIS as described herein. For example, the communications manager 1220 may include a reference signal manager 1225, a measurements manager 1230, a beam focusing distance manager 1235, a RIS attributes manager 1240, an angular direction manager 1245, a beam manager 1250, a phase matrix manager 1255, a RSRP manager 1260, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The reference signal manager 1225 is capable of, configured to, or operable to support a means for transmitting, to a RIS, a set of reference signals for steering by the RIS to a UE via a set of beams, each beam of the set of beams having a respective beam focusing distance selected from a set of beam focusing distances within a near field region of the RIS. The measurements manager 1230 is capable of, configured to, or operable to support a means for receiving, from the UE, measurements for the set of reference signals. The beam focusing distance manager 1235 is capable of, configured to, or operable to support a means for transmitting, to the RIS, an indication of a beam focusing distance for the UE based on the measurements.

In some examples, the RIS attributes manager 1240 is capable of, configured to, or operable to support a means for receiving, from the RIS, control signaling indicating attributes of the RIS, where the beam focusing distance for the UE based on the attributes of the RIS.

In some examples, the set of beam focusing distances include varying distance deltas.

In some examples, the angular direction manager 1245 is capable of, configured to, or operable to support a means for transmitting, to the RIS, first control signaling indicating an angular direction for the set of beams.

In some examples, the beam manager 1250 is capable of, configured to, or operable to support a means for transmitting, to the RIS, second control signaling indicating the set of beam focusing distances.

In some examples, the RIS attributes manager 1240 is capable of, configured to, or operable to support a means for receiving, from the RIS, control signaling indicating attributes of the RIS, where the set of beam focusing distances is based on the attributes of the RIS.

In some examples, the phase matrix manager 1255 is capable of, configured to, or operable to support a means for transmitting, to the RIS, control signaling indicating a phase matrix, where the phase matrix indicates an angular direction for the set of beams.

In some examples, to support receiving measurements for the set of reference signals, the reference signal manager 1225 is capable of, configured to, or operable to support a means for receiving a set of RSRP values corresponding to the set of reference signals.

In some examples, to support set of beams, the beam manager 1250 is capable of, configured to, or operable to support a means for a first beam having a first beam focusing distance and a second beam having a second beam focusing distance.

In some examples, to support receiving measurements for the set of reference signals, the reference signal manager 1225 is capable of, configured to, or operable to support a means for receiving a first RSRP value associated with the beam and a second RSRP value associated with the second beam. In some examples, to support receiving measurements for the set of reference signals, the RSRP manager 1260 is capable of, configured to, or operable to support a means for computing a difference between the first RSRP value and the second RSRP value. In some examples, to support receiving measurements for the set of reference signals, the beam focusing distance manager 1235 is capable of, configured to, or operable to support a means for identifying the beam focusing distance for the UE based on comparing the difference to a delta RSRP raster.

Figure 13:
FIG. 13 shows a diagram of a system including a device that supports techniques for distance scanning in a near field region of a RIS in accordance with various aspects of the present disclosure.

FIG. 13 shows a diagram of a system 1300 including a device 1305 that supports techniques for distance scanning in a near field region of a RIS in accordance with various aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for distance scanning in a near field region of a RIS). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 is capable of, configured to, or operable to support a means for transmitting, to a RIS, a set of reference signals for steering by the RIS to a UE via a set of beams, each beam of the set of beams having a respective beam focusing distance selected from a set of beam focusing distances within a near field region of the RIS. The communications manager 1320 is capable of, configured to, or operable to support a means for receiving, from the UE, measurements for the set of reference signals. The communications manager 1320 is capable of, configured to, or operable to support a means for transmitting, to the RIS, an indication of a beam focusing distance for the UE based on the measurements.

By including or configuring the communications manager 1320 in accordance with examples as described herein, the device 1305 may support techniques for improved communication reliability, more efficient utilization of communication resources, improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for distance scanning in a near field region of a RIS as described herein, or the processor 1335 and the memory 1325 may be otherwise configured to perform or support such operations.

Figure 14:
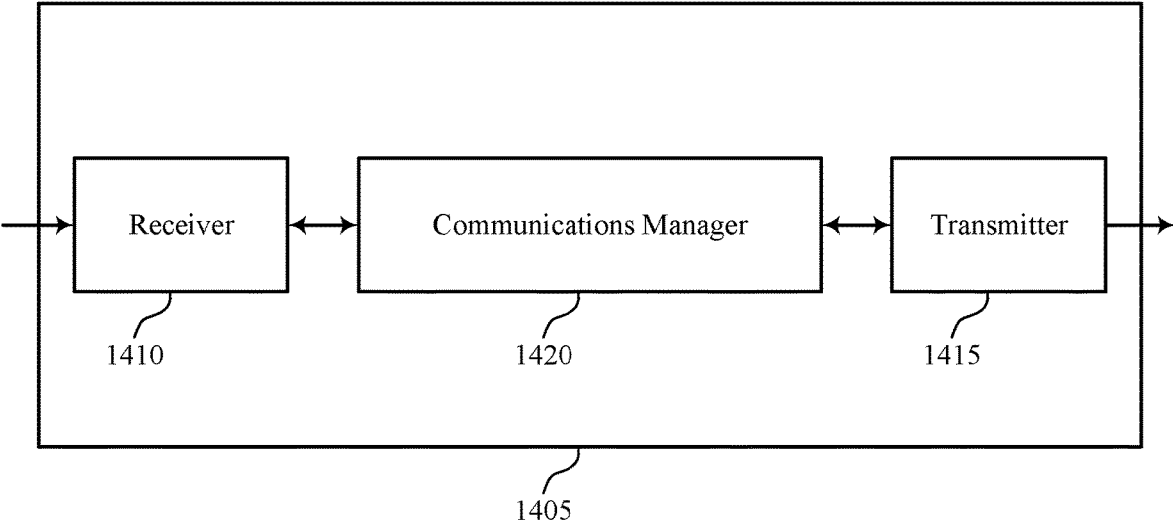

FIG. 14 shows a block diagram 1400 of a device 1405 that supports techniques for distance scanning in a near field region of a RIS in accordance with various aspects of the present disclosure. The device 1405 may be an example of aspects of a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for distance scanning in a near field region of a RIS). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for distance scanning in a near field region of a RIS). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of techniques for distance scanning in a near field region of a RIS as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a UE in accordance with examples as disclosed herein. For example, the communications manager 1420 is capable of, configured to, or operable to support a means for receiving, from a RIS, a set of reference signals via a set of beams, each beam of the set of beams having a respective beam focusing distance selected from a set of beam focusing distances within a near field region of the RIS. The communications manager 1420 is capable of, configured to, or operable to support a means for transmitting, to a network entity, measurements for the set of reference signals.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for more efficient utilization of communication resources.

FIG. 15 shows a block diagram 1500 of a device 1505 that supports techniques for distance scanning in a near field region of a RIS in accordance with various aspects of the present disclosure. The device 1505 may be an example of aspects of a device 1405 or a UE 115 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for distance scanning in a near field region of a RIS). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for distance scanning in a near field region of a RIS). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of techniques for distance scanning in a near field region of a RIS as described herein. For example, the communications manager 1520 may include a reference signals manager 1525 a measurements manager 1530, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communication at a UE in accordance with examples as disclosed herein. The reference signals manager 1525 is capable of, configured to, or operable to support a means for receiving, from a RIS, a set of reference signals via a set of beams, each beam of the set of beams having a respective beam focusing distance selected from a set of beam focusing distances within a near field region of the RIS. The measurements manager 1530 is capable of, configured to, or operable to support a means for transmitting, to a network entity, measurements for the set of reference signals.

Figure 16:
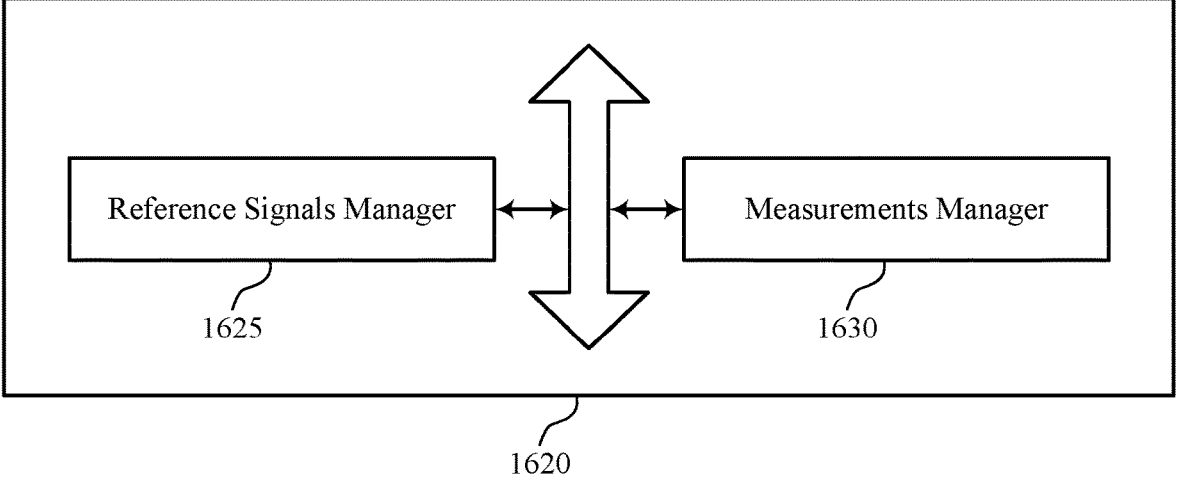
FIG. 16 shows a block diagram of a communications manager that supports techniques for distance scanning in a near field region of a RIS in accordance with various aspects of the present disclosure.

FIG. 16 shows a block diagram 1600 of a communications manager 1620 that supports techniques for distance scanning in a near field region of a RIS in accordance with various aspects of the present disclosure. The communications manager 1620 may be an example of aspects of a communications manager 1420, a communications manager 1520, or both, as described herein. The communications manager 1620, or various components thereof, may be an example of means for performing various aspects of techniques for distance scanning in a near field region of a RIS as described herein. For example, the communications manager 1620 may include a reference signals manager 1625 a measurements manager 1630, or any combination thereof. Each of these components may communicate, directly or indirectly, with one another (e.g., via one or more buses).

The communications manager 1620 may support wireless communication at a UE in accordance with examples as disclosed herein. The reference signals manager 1625 is capable of, configured to, or operable to support a means for receiving, from a RIS, a set of reference signals via a set of beams, each beam of the set of beams having a respective beam focusing distance selected from a set of beam focusing distances within a near field region of the RIS. The measurements manager 1630 is capable of, configured to, or operable to support a means for transmitting, to a network entity, measurements for the set of reference signals.

In some examples, to support transmitting the measurements for the set of reference signals, the measurements manager 1630 is capable of, configured to, or operable to support a means for transmitting a set of RSRP values corresponding to the set of reference signals.

In some examples, the set of beam focusing distances include varying distance deltas.

In some examples, to support receiving the set of reference signals via the set of beams, the reference signals manager 1625 is capable of, configured to, or operable to support a means for receiving a first reference signal via a first beam having a first beam focusing distance and receiving a second reference signal via a second beam having a second beam focusing distance.

In some examples, to support transmitting the measurements for the set of reference signals, the measurements manager 1630 is capable of, configured to, or operable to support a means for transmitting a first RSRP value associated with the first reference signal and a second RSRP value associated with the second reference signal.

Figure 17:
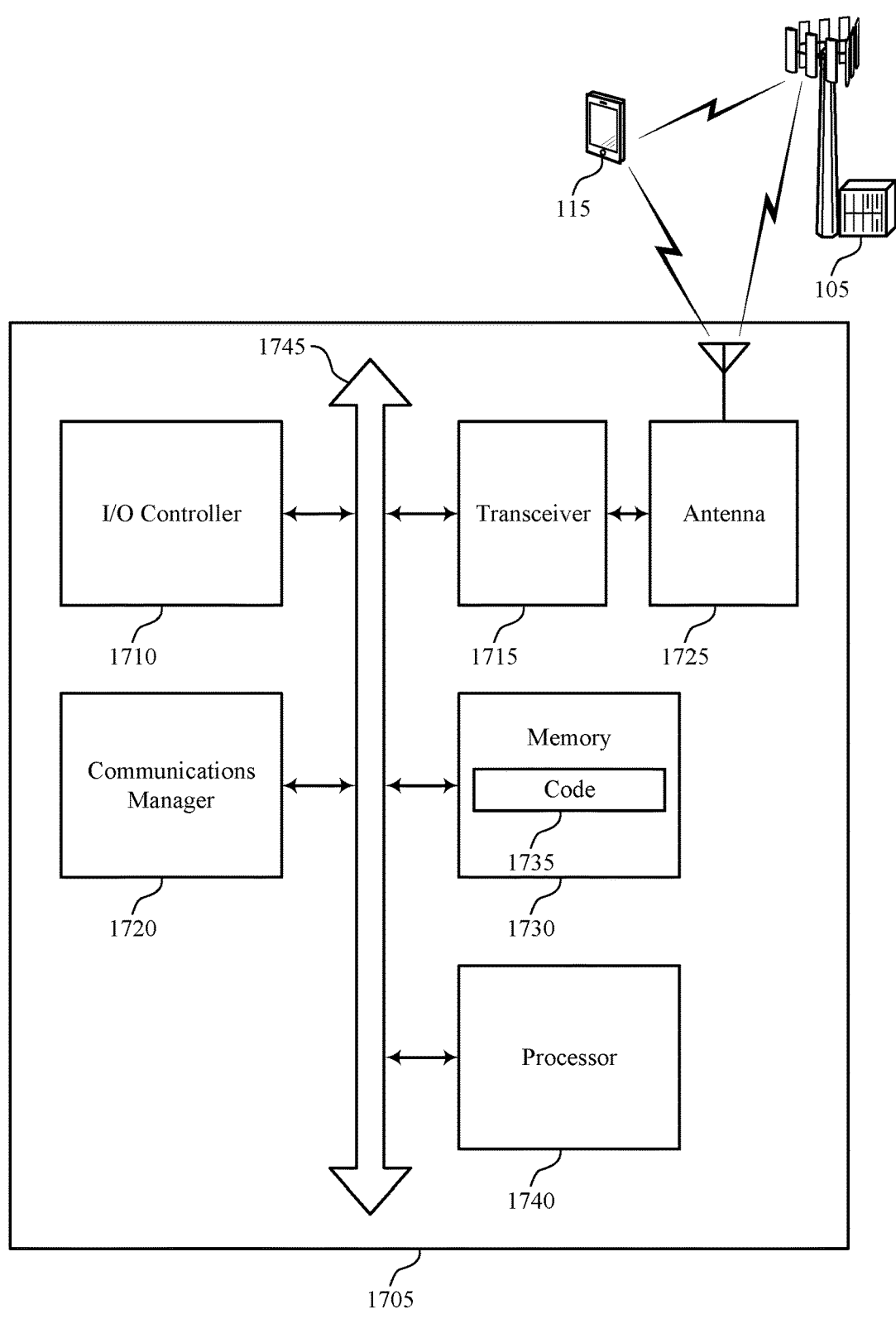
FIG. 17 shows a diagram of a system including a device that supports techniques for distance scanning in a near field region of a RIS in accordance with various aspects of the present disclosure.

FIG. 17 shows a diagram of a system 1700 including a device 1705 that supports techniques for distance scanning in a near field region of a RIS in accordance with various aspects of the present disclosure. The device 1705 may be an example of or include the components of a device 1405, a device 1505, or a UE 115 as described herein. The device 1705 may communicate (e.g., wirelessly) with one or more network entities 105, one or more UEs 115, or any combination thereof. The device 1705 may include components for bi-directional voice and data communications including components for transmitting and receiving communications, such as a communications manager 1720, an input/output (I/O) controller 1710, a transceiver 1715, an antenna 1725, a memory 1730, code 1735, and a processor 1740. These components may be in electronic communication or otherwise coupled (e.g., operatively, communicatively, functionally, electronically, electrically) via one or more buses (e.g., a bus 1745).

The I/O controller 1710 may manage input and output signals for the device 1705. The I/O controller 1710 may also manage peripherals not integrated into the device 1705. In some cases, the I/O controller 1710 may represent a physical connection or port to an external peripheral. In some cases, the I/O controller 1710 may utilize an operating system such as iOS®, ANDROID®, MS-DOS®, MS-WINDOWS®, OS/2®, UNIX®, LINUX®, or another known operating system. Additionally, or alternatively, the I/O controller 1710 may represent or interact with a modem, a keyboard, a mouse, a touchscreen, or a similar device. In some cases, the I/O controller 1710 may be implemented as part of a processor, such as the processor 1740. In some cases, a user may interact with the device 1705 via the I/O controller 1710 or via hardware components controlled by the I/O controller 1710.

In some cases, the device 1705 may include a single antenna 1725. However, in some other cases, the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include random access memory (RAM) and read-only memory (ROM). The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a basic I/O system (BIOS) which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting techniques for distance scanning in a near field region of a RIS). For example, the device 1705 or a component of the device 1705 may include a processor 1740 and memory 1730 coupled with or to the processor 1740, the processor 1740 and memory 1730 configured to perform various functions described herein.

The communications manager 1720 may support wireless communication at a UE in accordance with examples as disclosed herein. For example, the communications manager 1720 is capable of, configured to, or operable to support a means for receiving, from a RIS, a set of reference signals via a set of beams, each beam of the set of beams having a respective beam focusing distance selected from a set of beam focusing distances within a near field region of the RIS. The communications manager 1720 is capable of, configured to, or operable to support a means for transmitting, to a network entity, measurements for the set of reference signals.

By including or configuring the communications manager 1720 in accordance with examples as described herein, the device 1705 may support techniques for improved communication reliability, more efficient utilization of communication resources, improved coordination between devices.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of techniques for distance scanning in a near field region of a RIS as described herein, or the processor 1740 and the memory 1730 may be otherwise configured to perform or support such operations.

Figure 18:
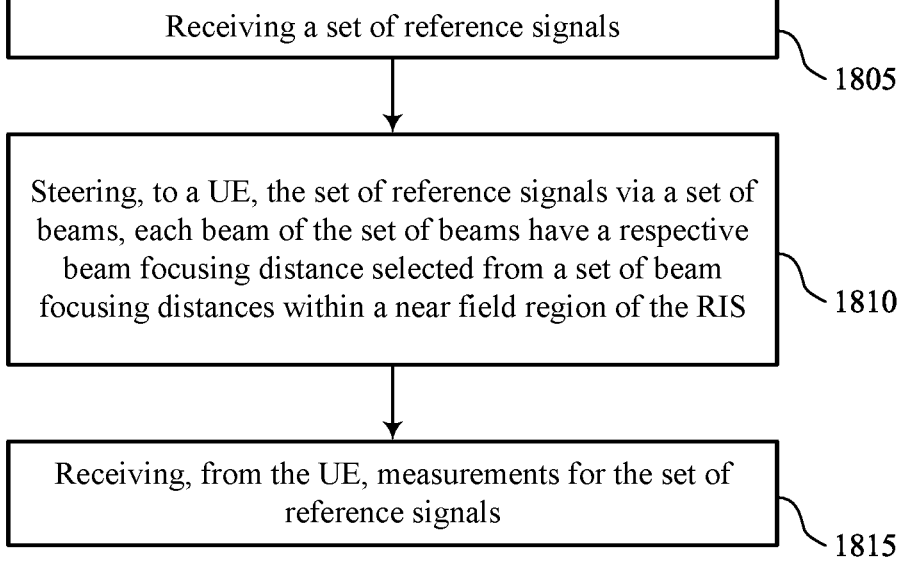

FIG. 18 shows a flowchart illustrating a method 1800 that supports techniques for distance scanning in a near field region of a RIS in accordance with aspects of the present disclosure. The operations of the method 1800 may be implemented by a RIS or its components as described herein. For example, the operations of the method 1800 may be performed by a RIS as described with reference to FIGS. 1 through 9. In some examples, a RIS may execute a set of instructions to control the functional elements of the wireless RIS to perform the described functions. Additionally, or alternatively, the wireless RIS may perform aspects of the described functions using special-purpose hardware.

At 1805, the method may include receiving a set of reference signals. The operations of 1805 may be performed in accordance with examples as disclosed herein. In some examples, aspects of the operations of 1805 may be performed by a reference signals manager 825 as described with reference to FIG. 8.

At 1810, the method may include steering, to a UE, the set of reference signals via a set of beams, each beam of the set of beams having a respective beam focusing distance selected from a set of beam focusing distances within a near field region of the RIS. The operations of 1810 may be performed in accordance with examples as disclosed herein. In some examples, aspects of the operations of 1810 may be performed by a beam manager 830 as described with reference to FIG. 8.

At 1815, the method may include receiving, from the UE, measurements for the set of reference signals. The operations of 1815 may be performed in accordance with examples as disclosed herein. In some examples, aspects of the operations of 1815 may be performed by a measurements manager 835 as described with reference to FIG. 8.

FIG. 19 shows a flowchart illustrating a method 1900 that supports techniques for distance scanning in a near field region of a RIS in accordance with aspects of the present disclosure. The operations of the method 1900 may be implemented by a RIS or its components as described herein. For example, the operations of the method 1900 may be performed by a RIS as described with reference to FIGS. 1 through 9. In some examples, a RIS may execute a set of instructions to control the functional elements of the wireless RIS to perform the described functions. Additionally, or alternatively, the wireless RIS may perform aspects of the described functions using special-purpose hardware.

At 1905, the method may include receiving a set of reference signals. The operations of 1905 may be performed in accordance with examples as disclosed herein. In some examples, aspects of the operations of 1905 may be performed by a reference signals manager 825 as described with reference to FIG. 8.

At 1910, the method may include steering, to a UE, the set of reference signals via a set of beams, each beam of the set of beams having a respective beam focusing distance selected from a set of beam focusing distances within a near field region of the RIS. The operations of 1910 may be performed in accordance with examples as disclosed herein. In some examples, aspects of the operations of 1910 may be performed by a beam manager 830 as described with reference to FIG. 8.

At 1915, the method may include receiving, from the UE, measurements for the set of reference signals. The operations of 1915 may be performed in accordance with examples as disclosed herein. In some examples, aspects of the operations of 1915 may be performed by a measurements manager 835 as described with reference to FIG. 8.

At 1920, the method may include receiving, from the network entity, an indication of a beam focusing distance for the UE. The operations of 1920 may be performed in accordance with examples as disclosed herein. In some examples, aspects of the operations of 1920 may be performed by a beam focusing distance manager 840 as described with reference to FIG. 8.

FIG. 20 shows a flowchart illustrating a method 2000 that supports techniques for distance scanning in a near field region of a RIS in accordance with aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 2005, the method may include transmitting, to a RIS (RIS), a set of reference signals for steering by the RIS to a UE via a set of beams, each beam of the set of beams having a respective beam focusing distance selected from a set of beam focusing distances within a near field region of the RIS. The operations of 2005 may be performed in accordance with examples as disclosed herein. In some examples, aspects of the operations of 2005 may be performed by a reference signal manager 1225 as described with reference to FIG. 12.

At 2010, the method may include receiving, from the UE, measurements for the set of reference signals. The operations of 2010 may be performed in accordance with examples as disclosed herein. In some examples, aspects of the operations of 2010 may be performed by a measurements manager 1230 as described with reference to FIG. 12.

At 2015, the method may include transmitting, to the RIS, an indication of a beam focusing distance for the UE based on the measurements. The operations of 2015 may be performed in accordance with examples as disclosed herein. In some examples, aspects of the operations of 2015 may be performed by a beam focusing distance manager 1235 as described with reference to FIG. 12.

Figure 21:
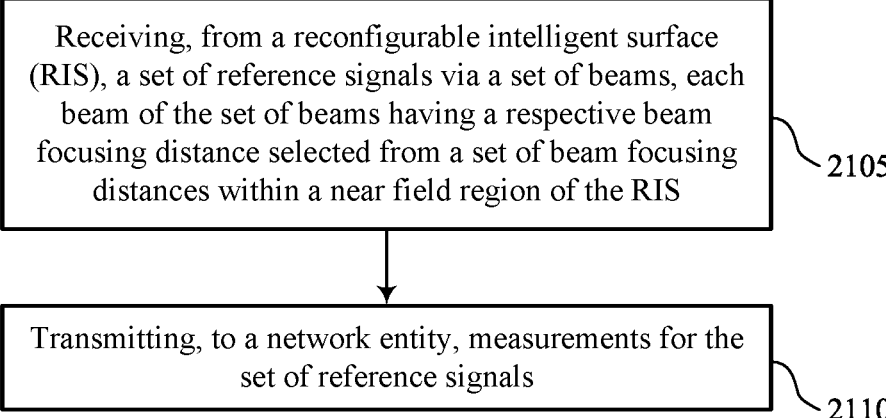

FIG. 21 shows a flowchart illustrating a method 2100 that supports techniques for distance scanning in a near field region of a RIS in accordance with aspects of the present disclosure. The operations of the method 2100 may be implemented by a UE or its components as described herein. For example, the operations of the method 2100 may be performed by a UE 115 as described with reference to FIGS. 1 through 5 and 14 through 17. In some examples, a UE may execute a set of instructions to control the functional elements of the wireless UE to perform the described functions. Additionally, or alternatively, the wireless UE may perform aspects of the described functions using special-purpose hardware.

At 2105, the method may include receiving, from a RIS, a set of reference signals via a set of beams, each beam of the set of beams having a respective beam focusing distance selected from a set of beam focusing distances within a near field region of the RIS. The operations of 2105 may be performed in accordance with examples as disclosed herein. In some examples, aspects of the operations of 2105 may be performed by a reference signals manager 1625 as described with reference to FIG. 16.

At 2110, the method may include transmitting, to a network entity, measurements for the set of reference signals. The operations of 2110 may be performed in accordance with examples as disclosed herein. In some examples, aspects of the operations of 2110 may be performed by a measurements manager 1630 as described with reference to FIG. 16.

The following provides an overview of aspects of the present disclosure:

Aspect 1: A method for wireless communication at a RIS, comprising: receiving a set of reference signals; steering, to a UE, the set of reference signals via a set of beams, each beam of the set of beams having a respective beam focusing distance selected from a set of beam focusing distances within a near field region of the RIS; and receiving, from the UE, measurements for the set of reference signals.

Aspect 2: The method of aspect 1, further comprising: transmitting, to a network entity, the measurements for the set of reference signals.

Aspect 3: The method of any of aspects 1 through 2, further comprising: receiving, from a network entity, an indication of a beam focusing distance for the UE based at least in part on the measurements.

Aspect 4: The method of any of aspects 1 through 3, wherein the set of beam focusing distances comprise varying distance deltas.

Aspect 5: The method of any of aspects 1 through 4, further comprising: receiving, from a network entity, first control signaling indicating an angular direction for the set of beams.

Aspect 6: The method of aspect 5, wherein steering the set of reference signals via the set of beams comprises: steering the set of beams in the angular direction.

Aspect 7: The method of any of aspects 1 through 6, wherein steering the set of reference signals via the set of beams comprises: obtaining the set of beam focusing distances from a codebook.

Aspect 8: The method of any of aspects 1 through 7, further comprising: receiving, from a network entity, third control signaling indicating a phase matrix, wherein the phase matrix indicating an angular direction for the set of beams.

Aspect 9: The method of any of aspects 1 through 8, further comprising: transmitting, to a network entity, control signaling indicating attributes of the RIS.

Aspect 10: The method of any of aspects 1 through 9, wherein the set of beams comprises: a first beam having a first beam focusing distance and a second beam having a second beam focusing distance.

Aspect 11: The method of any of aspects 1 through 10, further comprising: receiving, from a network entity, second control signaling indicating the set of beam focusing distances.

Aspect 12: The method of aspect 11, wherein the second control signaling indicating the set of beam focusing distances from a codebook.

Aspect 13: A method for wireless communication at a network entity, comprising: transmitting, to a RIS, a set of reference signals for steering by the RIS to a UE via a set of beams, each beam of the set of beams having a respective beam focusing distance selected from a set of beam focusing distances within a near field region of the RIS; receiving, from the UE, measurements for the set of reference signals; and transmitting, to the RIS, an indication of a beam focusing distance for the UE based at least in part on the measurements.

Aspect 14: The method of aspect 13, further comprising: receiving, from the RIS, control signaling indicating attributes of the RIS, wherein the beam focusing distance for the UE based at least in part on the attributes of the RIS.

Aspect 15: The method of any of aspects 13 through 14, wherein the set of beam focusing distances comprise varying distance deltas.

Aspect 16: The method of any of aspects 13 through 15, further comprising: transmitting, to the RIS, first control signaling indicating an angular direction for the set of beams.

Aspect 17: The method of any of aspects 13 through 16, further comprising: transmitting, to the RIS, second control signaling indicating the set of beam focusing distances.

Aspect 18: The method of any of aspects 13 through 17, further comprising: receiving, from the RIS, control signaling indicating attributes of the RIS, wherein the set of beam focusing distances is based at least in part on the attributes of the RIS.

Aspect 19: The method of any of aspects 13 through 18, further comprising: transmitting, to the RIS, control signaling indicating a phase matrix, wherein the phase matrix indicates an angular direction for the set of beams.

Aspect 20: The method of any of aspects 13 through 19, wherein receiving measurements for the set of reference signals comprises: receiving a set of RSRP values corresponding to the set of reference signals.

Aspect 21: The method of any of aspects 13 through 20, wherein the set of beams comprises: a first beam having a first beam focusing distance and a second beam having a second beam focusing distance.

Aspect 22: The method of aspect 21, wherein receiving measurements for the set of reference signals comprises: receiving a first RSRP value associated with the first beam and a second RSRP value associated with the second beam; computing a difference between the first RSRP value and the second RSRP value; and identifying the beam focusing distance for the UE based at least in part on comparing the difference to a delta RSRP raster.

Aspect 23: A method for wireless communication at a UE, comprising: receiving, from a RIS, a set of reference signals via a set of beams, each beam of the set of beams having a respective beam focusing distance selected from a set of beam focusing distances within a near field region of the RIS; and transmitting, to a network entity, measurements for the set of reference signals.

Aspect 24: The method of aspect 23, wherein transmitting the measurements for the set of reference signals comprises: transmitting a set of RSRP values corresponding to the set of reference signals.

Aspect 25: The method of any of aspects 23 through 24, wherein the set of beam focusing distances comprise varying distance deltas.

Aspect 26: The method of any of aspects 23 through 25, wherein receiving the set of reference signals via the set of beams comprises: receiving a first reference signal via a first beam having a first beam focusing distance and receiving a second reference signal via a second beam having a second beam focusing distance.

Aspect 27: The method of aspect 26, wherein transmitting the measurements for the set of reference signals comprises: transmitting a first RSRP value associated with the first reference signal and a second RSRP value associated with the second reference signal.

Aspect 28: An apparatus for wireless communication at a RIS, comprising a processor; memory coupled with the processor; and instructions stored in the memory and executable by the processor to cause the apparatus to perform a method of any of aspects 1 through 12.

Aspect 29: An apparatus for wireless communication at a RIS, comprising at least one means for performing a method of any of aspects 1 through 12.

Aspect 30: A non-transitory computer-readable medium storing code for wireless communication at a RIS, the code comprising instructions executable by a processor to perform a method of any of aspects 1 through 12.

Aspect 31: An apparatus for wireless communication at a network entity, comprising a processor; memory coupled with the processor; and instructions stored in the memory and executable by the processor to cause the apparatus to perform a method of any of aspects 13 through 22.

Aspect 32: An apparatus for wireless communication at a network entity, comprising at least one means for performing a method of any of aspects 13 through 22.

Aspect 33: A non-transitory computer-readable medium storing code for wireless communication at a network entity, the code comprising instructions executable by a processor to perform a method of any of aspects 13 through 22.

Aspect 34: An apparatus for wireless communication at a UE, comprising a processor; memory coupled with the processor; and instructions stored in the memory and executable by the processor to cause the apparatus to perform a method of any of aspects 23 through 27.

Aspect 35: An apparatus for wireless communication at a UE, comprising at least one means for performing a method of any of aspects 23 through 27.

Aspect 36: A non-transitory computer-readable medium storing code for wireless communication at a UE, the code comprising instructions executable by a processor to perform a method of any of aspects 23 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a reconfigurable intelligent surface (RIS), comprising:

receiving a set of reference signals;

steering, to a user equipment (UE), the set of reference signals via a set of beams, each beam of the set of beams having a respective beam focusing distance selected from a set of beam focusing distances within a near field region of the RIS, wherein the set of beams comprises a first beam having a first beam focusing distance and a second beam having a second beam focusing distance; and receiving, from the UE, measurements for the set of reference signals, wherein receiving measurements for the set of reference signals comprises:

receiving a first reference signal received power value associated with the first beam and a second reference signal received power value associated with the second beam;

computing a difference between the first reference signal received power value and the second reference signal received power value; and identifying the beam focusing distance for the UE based at least in part on comparing the difference to a delta reference signal received power raster.

2. The method of claim 1, further comprising:

transmitting, to a network entity, the measurements for the set of reference signals.

3. The method of claim 1, further comprising:

receiving, from a network entity, an indication of a beam focusing distance for the UE based at least in part on the measurements.

4. The method of claim 1, wherein the set of beam focusing distances comprise varying distance deltas.

5. The method of claim 1, further comprising:

receiving, from a network entity, first control signaling indicating an angular direction for the set of beams.

6. The method of claim 5, wherein steering the set of reference signals via the set of beams comprises:

steering the set of beams in the angular direction.

7. The method of claim 1, wherein steering the set of reference signals via the set of beams comprises:

obtaining the set of beam focusing distances from a codebook.

8. The method of claim 1, further comprising:

receiving, from a network entity, third control signaling indicating a phase matrix, wherein the phase matrix indicating an angular direction for the set of beams.

9. The method of claim 1, further comprising:

transmitting, to a network entity, control signaling indicating attributes of the RIS.

10. The method of claim 1, wherein the set of beams comprises:

a first beam having a first beam focusing distance and a second beam having a second beam focusing distance.

11. The method of claim 1, further comprising:

receiving, from a network entity, second control signaling indicating the set of beam focusing distances.

12. The method of claim 11, wherein the second control signaling indicating the set of beam focusing distances from a codebook.

13. A method for wireless communication at a network entity, comprising:

transmitting, to a reconfigurable intelligent surface (RIS), a set of reference signals for steering by the RIS to a user equipment (UE) via a set of beams, each beam of the set of beams having a respective beam focusing distance selected from a set of beam focusing distances within a near field region of the RIS, wherein the set of beam comprises a first beam having a first beam focusing distance and a second beam having a second beam focusing distance;

receiving, from the UE, measurements for the set of reference signals, wherein receiving measurements for the set of reference signals comprises:

receiving a first reference signal received power value associated with the first beam and a second reference signal received power value associated with the second beam;

computing a difference between the first reference signal received power value and the second reference signal received power value; and identifying the beam focusing distance for the UE based at least in part on comparing the difference to a delta reference signal received power raster; and transmitting, to the RIS, an indication of a beam focusing distance for the UE based at least in part on the measurements.

14. The method of claim 13, further comprising:

receiving, from the RIS, control signaling indicating attributes of the RIS, wherein the beam focusing distance for the UE based at least in part on the attributes of the RIS.

15. The method of claim 13, wherein the set of beam focusing distances comprise varying distance deltas.

16. The method of claim 13, further comprising:

transmitting, to the RIS, first control signaling indicating an angular direction for the set of beams.

17. The method of claim 13, further comprising:

transmitting, to the RIS, second control signaling indicating the set of beam focusing distances.

18. The method of claim 13, further comprising:

receiving, from the RIS, control signaling indicating attributes of the RIS, wherein the set of beam focusing distances is based at least in part on the attributes of the RIS.

19. The method of claim 13, further comprising:

transmitting, to the RIS, control signaling indicating a phase matrix, wherein the phase matrix indicates an angular direction for the set of beams.

20. The method of claim 13, wherein receiving measurements for the set of reference signals comprises:

receiving a set of reference signal received power values corresponding to the set of reference signals.

21. An apparatus for wireless communication at a reconfigurable intelligent surface (RIS), comprising:

a processor;

one or more memories coupled with the processor; and instructions stored in the one or more memories and executable by the processor to cause the apparatus to:

receive a set of reference signals;

steering, to a user equipment (UE), the set of reference signals via a set of beams, each beam of the set of beams have a respective beam focusing distance selected from a set of beam focusing distances within a near field region of the RIS, wherein the set of beams comprises a first beam having a first beam focusing distance and a second beam having a second beam focusing distance; and receive, from the UE, measurements for the set of reference signals, wherein receive measurements for the set of reference signals comprises:

receive a first reference signal received power value associated with the first beam and a second reference signal received power value associated with the second beam;

compute a difference between the first reference signal received power value and the second reference signal received power value; and identify the beam focusing distance for the UE based at least in part on comparing the difference to a delta reference signal received power raster.

22. The apparatus of claim 21, wherein the instructions are further executable by the processor to cause the apparatus to:

transmit, to a network entity, the measurements for the set of reference signals.

23. The apparatus of claim 21, wherein the instructions are further executable by the processor to cause the apparatus to:

receive, from a network entity, an indication of a beam focusing distance for the UE based at least in part on the measurements.

* * * * *